United States Patent
Shen et al.

(10) Patent No.: US 12,423,593 B2
(45) Date of Patent: Sep. 23, 2025

(54) SYSTEMS AND METHODS FOR SYNTHETIC INTERVENTIONS

(71) Applicant: Massachusetts Institute of Technology, Cambridge, MA (US)

(72) Inventors: Dennis Shen, Irvine, CA (US); Devavrat D. Shah, Waban, MA (US); Anish Agarwal, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 789 days.

(21) Appl. No.: 17/658,712

(22) Filed: Apr. 11, 2022

(65) Prior Publication Data
US 2022/0414483 A1 Dec. 29, 2022

Related U.S. Application Data

(60) Provisional application No. 63/209,567, filed on Jun. 11, 2021.

(51) Int. Cl.
*G06N 5/022* (2023.01)
*G06N 3/0475* (2023.01)
(Continued)

(52) U.S. Cl.
CPC ............ *G06N 5/022* (2013.01); *G06N 3/0475* (2023.01); *G06N 20/10* (2019.01); *G06N 5/04* (2013.01); *G06N 7/01* (2023.01)

(58) Field of Classification Search
CPC ........ G06N 5/022; G06N 5/04; G06N 3/0475; G06N 20/10; G06N 7/01; G06N 3/02; G06N 3/04; G06N 20/00; G06N 20/20
See application file for complete search history.

(56) References Cited

U.S. PATENT DOCUMENTS 8,682,828 B2   3/2014   Barrett et al.
9,633,150 B2   4/2017   Barker
(Continued)

OTHER PUBLICATIONS

Junqiao Chen; "The validity of synthetic clinical data: a validation study of a leading synthetic data generator (Synthea) using clinical quality measures"; (Year: 2019).*
(Continued)

*Primary Examiner* — Shane D Woolwine
(74) *Attorney, Agent, or Firm* — Daly, Crowley, Mofford & Durkee, LLP

(57) ABSTRACT

A computer-implemented method includes: identifying, from first and second data, interventions common to a target unit and one or more of a plurality of donor units as filtered donor units, the first data corresponding to the target unit under one or more interventions, the second data corresponding to the plurality of donor units each under one or more interventions; identifying, from the first data, third data corresponding to the target unit under the common interventions; identifying, from the second data, fourth data corresponding to the filtered donor units under the common interventions; identifying, from the second data, fifth data corresponding to the filtered donor units under a subject intervention; generating, from the third and fourth data, a learned model representing to a relationship between the target unit and the filtered donor units; applying the learned model to the fifth data to generate the synthetic data; and outputting the synthetic data.

19 Claims, 11 Drawing Sheets

(51) Int. Cl.
  *G06N 5/04* (2023.01)
  *G06N 7/01* (2023.01)
  *G06N 20/10* (2019.01)

(56) References Cited

U.S. PATENT DOCUMENTS

| | | | |
|---|---|---|---|
| 10,635,939 B2 | 4/2020 | Watson et al. | |
| 10,685,150 B2 | 6/2020 | Barberis et al. | |
| 2010/0293123 A1* | 11/2010 | Barrett | G06Q 30/00 |
| | | | 706/13 |
| 2017/0260590 A1* | 9/2017 | Eltoukhy | C12Q 1/6827 |
| 2017/0316324 A1 | 11/2017 | Barrett et al. | |
| 2019/0347590 A1* | 11/2019 | Rajasekaran | G06Q 10/0635 |
| 2020/0270699 A1* | 8/2020 | Mir | C12Q 1/6883 |
| 2022/0171290 A1* | 6/2022 | Onose | G03F 7/70625 |
| 2022/0215243 A1* | 7/2022 | Narayanaswami | |
| | | | G06F 18/2193 |
| 2022/0223293 A1* | 7/2022 | Steinberg-Koch | G16H 20/00 |

OTHER PUBLICATIONS

Nina Haug; "Ranking the effectiveness of worldwide Covid-19 government interventions" (Year: 2020).*

Alberto Abadie; Using Synthetic Controls: Feasibility, Data Requirements, and Methodological Aspects (Year: 2021).*

Abadie, Alberto "Using Synthetic Controls: Feasibility, Data Requirements, and Methodological Aspects" Journal of Economics Literature; 2021; 35 Pages.

Abadie, Alberto "Using Synthetic Controls: Feasibility, Data Requirements, and Methodological Aspects" Journal of Economics Literature; Jun. 2020; 53 Pages.

Abadie, Alberto et al. "Synthetic Control Methods for Comparative Case Studies: Estimating the Effect of California's Tobacco Control Program" Journal of the American Statistical Association; Jun. 2010; 13 Pages.

Agarwal, Anish et al. "Two Burning Questions on Covid-19: Did Shutting Down the Economy Help? Can we (Partially) Reopen the Economy Without Risking the Second Wave?" Massachusetts Institute of Technology; May 10, 2020; 12 Pages.

Agarwal, Anish et al. "On Robustness of Principal Component Regression" Massachusetts Institute of Technology; May 19, 2021; 95 Pages.

Amjad, Muhammad et al. "Robust Synthetic Control" Journal of Machine Learning Research 19; Aug. 2018; 51 Pages.

Chen, Yixuan et al. "Generation of Synthetic Data and Experimental Designs in Evaluating Interactions for Association Studies" Journal of Bioinformatics and Computational Biology; Aug. 2011; 5 Pages.

Doudchenko, Nick et al. "Designing Experiments with Synthetic Controls" Working Paper; 2019; 21 Pages.

Goncalves, Andre et al. "Generation and Evaluation of Synthetic Patient Data" BMC Medical Research Methodology; 2020; 40 Pages.

Reddy, T.A. et al. "Using Synthetic Data to Evaluate Multiple Regression and Principal Component Analyses for Statistical Modeling of Daily Building Energy Consumption;" 1994; 10 Pages.

Samartsidis, Pantelis "Assessing the Causal Effect of Binary Interventions from Observational Panel Data With Few Treated Units" Dec. 20, 2019; 31 Pages.

Samartsidis, Pantelis et al. "Review of Methods for Assessing the Causal Effect of Binary Interventions From Aggregate Time-Series Observational Data" Apr. 30, 2021; 30 Pages.

Shen, Dennis "Causal Inference: A Tensor's Perspective" Massachusetts Institute of Technology; Sep. 2020; 185 Pages.

White, Adam et al. "Measurable Counterfactual Local Explanations for Any Classifier" 24th European Conference on Artificial Intelligence—ECAI 2020; 2020; 7 Pages.

* cited by examiner

SYSTEMS AND METHODS FOR SYNTHETIC INTERVENTIONS

CROSS-REFERENCE TO RELATED APPLICATIONS

This application claims the benefit under 35 U.S.C. § 119 of U.S. Provisional Patent Application No. 63/209,567 filed on Jun. 11, 2021, which is hereby incorporated by reference herein in its entirety.

STATEMENT REGARDING FEDERALLY SPONSORED RESEARCH

This invention was made with government support under CMMI1462158 and CNS1523546 awarded by the National Science Foundation. The government has certain rights in the invention.

BACKGROUND

There is a growing wave towards personalized decision-making, where the aim is to select the optimal intervention for each unit from a collection of interventions. In policy evaluation, for instance, one may want to design a governmental policy (intervention) that is particularly suited to the socio-economic realities of a geographic location (unit). The key challenge in doing so—and indeed the fundamental problem of causal inference—is that one often only get to observe a unit undergo a single intervention or stay under control (i.e., no intervention). This is true not only in observational studies such as policy evaluation, but also in experimental settings such as clinical trials or A/B testing in e-commerce.

SUMMARY

Ideally, one would like to infer the counterfactual outcome of each unit under any intervention. The sub-problem of estimating what would have happened to a "treated" unit (i.e., one that undergoes an intervention) under control has a rich literature within econometrics and beyond. A prominent framework to do so within the panel data setting, where one gets repeated measurements of a unit across time, is synthetic controls (SC). At its core, SC builds a synthetic model of a treated unit as a weighted combination of control units to estimate this counterfactual outcome of interest. As an example, consider a canonical case study within the SC literature that evaluates the impact of tobacco legislations (interventions) on tobacco consumption within states in the United States (units). In particular, to assess the effect of California's Proposition 99, a large-scale tobacco control program that included raising taxes on cigarettes by 25 cents and other non-fiscal measures, the authors ask the question: "what would have happened to California in the absence of any tobacco control legislation (control)?" By expressing California as a weighted combination of control states (e.g., Colorado, Nevada, etc.), the authors find that there was a marked fall in tobacco consumption in California following Proposition 99, relative to the constructed "synthetic California". Given its broad applicability, the SC framework has been methodologically extended, analyzed, and applied to answer similar questions in numerous, diverse settings. Notably, SC has even been regarded as "one of the most important innovations in the policy evaluation literature in the last 15 years."

However, towards the broader goal of personalized decision-making, one needs to answer counterfactual questions beyond what would have happened under control. Continuing with the example above, these may include "what would have happened to Colorado (a control state) had it implemented a program similar to Proposition 99?" or "what would have happened to California had it instead raised cigarette taxes by 50 cents or more as in New York?". In essence, this boils down to answering what would have happened to a unit under any intervention, rather than just under control. Indeed, extending SC to overcome this challenge has been posed as an open question in. Embodiments of the present disclosure provide a meaningful answer to this question.

Embodiments of the present disclosure extend the SC framework to the multiple intervention setting, where unit-specific potential outcomes are estimated under any intervention averaged over the post-intervention period. In doing so, they can provide novel identification and inference results for SC. SI also presents a new perspective on learning with distribution shifts, an active area of research in econometrics and machine learning.

The structures and techniques disclosed herein find application in many different technical fields. For example, one application is in the context of healthcare and the life sciences, where it is feasible to perform multiple experiments on the same unit (e.g., cell type or patient subgroup), but the number of experiments is severely constrained by financial and ethical considerations. Thus, embodiment of the present disclosure can be used to generate synthetic interventions data for use in, for example, making treatment decisions. Another example includes "physical" experiments such as what works better for different stores within a chain of retail stores. Another example includes testing different user features in online computer systems such as E-commerce systems. As such, disclosed embodiments can find practical application in the improvement of computer systems by facilitating, for example, A/B testing of such systems to identify not only an optimal set of user features to provide within the system, but also identify a set of features that can improve the performance and efficiency of such systems (e.g., by identifying those features which reduce user interactions and thereby reduce computer network and processor usage).

According to one aspect of the disclosure, a method implemented on a computing device for generating synthetic data for a target unit had the target unit undergone a subject intervention can include: identifying, from first and second data, interventions common to the target unit and one or more of a plurality of donor units as filtered donor units, the first data corresponding to the target unit under one or more interventions, the second data corresponding to the plurality of donor units each under one or more interventions; identifying, from the first data, third data corresponding to the target unit under the common interventions; identifying, from the second data, fourth data corresponding to the filtered donor units under the common interventions; identifying, from the second data, fifth data corresponding to the filtered donor units under the subject intervention; generating, from the third and fourth data, a learned model representing to a relationship between the target unit and the filtered donor units; applying the learned model to the fifth data to generate the synthetic data; and outputting, by the computing device, the synthetic data.

In some embodiments, the method can further include retrieving the first and second data from a database. In some embodiments, identifying the interventions common to the target unit and one or more of a plurality of donor units can include filtering the first and second data to identify observations associated with common interventions between the target unit and the plurality of donor units that maximizes the minimum between a number of satisfactory observations and a number of the filtered donor units. In some embodiments, generating the learned model can include performing principal component regression (PCR) between the third and fourth data to generate a learned model that defines the unique minimum-norm linear relationship between the target unit and the filtered donor units.

In some embodiments, outputting the synthetic data can include storing the synthetic data in a database. In some embodiments, outputting the synthetic data can include transmitting the synthetic data to another computing device. In some embodiments, the another computing device may be part of a system configured to automate one or more decision-making processes using the synthetic data.

According to another aspect of the disclosure, a system for generating synthetic data for a target unit had the target unit undergone a subject intervention can include: a database configured to store first data corresponding to the target unit under one or more interventions and second data corresponding to a plurality of donor units each under one or more interventions; and a computing device comprising instructions. When executed, the instructions can cause the computing device to execute a process that corresponds to any embodiments of the aforementioned method.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Consider a panel data setting with observations of N units over T time periods. Each unit undergoes one of D interventions at time period $T_0$, with $1 \leq T_0 < T$, prior to which all units are under control. Presented herein is synthetic interventions (SI), a framework to estimate counterfactual outcomes of each unit under each of the D interventions, averaged over the post-intervention time periods. The present disclosure proves identification of this causal parameter under a latent factor model across time, units, and interventions. The present disclosure furnishes an estimator for this causal parameter and establish its consistency and asymptotic normality. In doing so, novel identification and inference results for the synthetic controls (SC) literature is provided. The present disclosure introduces a hypothesis test to validate when to use SI (and thereby SC). Through simulations and an empirical case-study, the efficacy of the SI framework is demonstrated.

Figure 1:
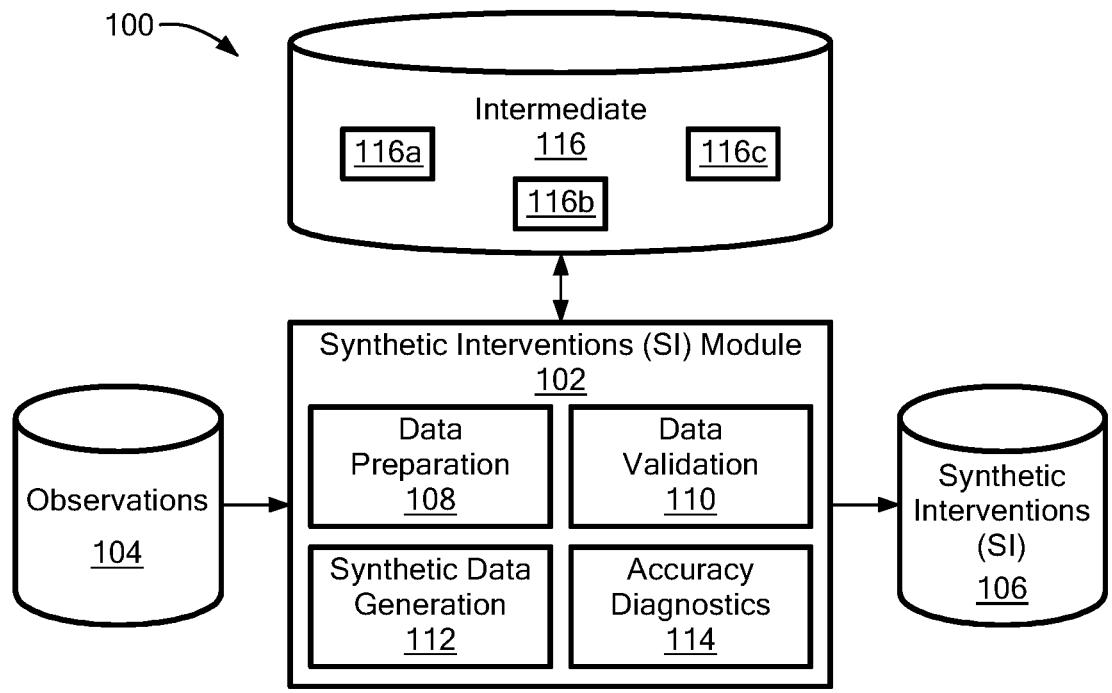
FIG. 1 is block diagram of a system for generating synthetic interventions, according to some embodiments of the present disclosure.

Turning to FIG. 1, an illustrative system 100 for generating synthetic interventions includes a synthetic interventions (SI) module 102, a first database 104, a second database 106, and a third database 116. As shown, SI module 102 can include a data preparation submodule 108, a data validation submodule 110, a synthetic data generation submodule 112, and an accuracy diagnostics submodule 114. Databases 104, 106, 116 may be provided as relational databases, object databases, key-value databases, flat files, etc. In some embodiments, two or more of databases 104, 106, 116 may be provided as the same logical or physical database.

First database (or "observations database") 104 can store observation data associated with for one or more units (e.g., geographic areas) having undergone one or more interventions/treatments. That is, observations database 104 can be configured to store, for one or more units, data associated with all interventions that unit went through. The observation data may be organized such that database 104 can be queried for (a) all observations associated with a particular unit (e.g., a so-called "target unit"); and (b) all observations associated with any units (e.g., so-called "donor units") that underwent a particular intervention. Second database (or "SI database") 106 can store SI data generated by the SI module 102. Third database (or "intermediate database") 116 can store intermediate or temporary data prepared by SI module 102 and used in the process of generating SI data. In the example shown, intermediate database 116 includes a first intermediate table 116a, a second intermediate table 116b, and a third intermediate table 116b.

SI module 102 and/or a given submodule 108, 110, 112, 114 can include electronic circuitry that performs the functions and operations described herein in conjunction therewith. The functions and operations can be hard coded into the electronic circuit or soft coded by way of instructions held in a memory device. The functions and operations can be performed using digital values or using analog signals. In some embodiments, a SI module 102 and/or a submodule 108, 110, 112, 114 can be embodied in an application specific integrated circuit (ASIC), which can be an analog ASIC or a digital ASIC, in a microprocessor with associated program memory and/or in a discrete electronic circuit, which can be analog or digital. In some embodiments, SI module 102 may be implemented as computer program instructions to perform functions and operations described herein. System 100 can include a memory (not shown) to store said computer program instructions and a computer processor (also not shown) to execute said computer program instructions.

A brief overview of the operation of system 100 is provided next. A more complete and detailed description of structures and techniques that can be implemented within system 100 for generating SI data is provided further below.

System 100 can generate synthetic data for a particular unit ("target unit") had that unit undergone a particular intervention ("subject intervention") using one or more of the following steps. Observations database 104 can be prepared to store, for each of one or more units, data associated with one or more interventions that unit went through. These one or more units can include, for example, the target unit and various other units.

Data preparation submodule 108 can query observations database 104 for observations associated with the target unit and also for observations associated with other units that underwent the subject intervention, referred to herein as "donor units." Data preparation submodule 108 can filter the data so as to identify the collection of observations associated with common interventions between target unit and the relevant donor units. For example, data preparation submodule 108 can filter the data so as to identify the collection of observations associated with common interventions between target unit and the relevant donor units that maximizes the minimum between (i) the number of satisfactory observations and (ii) the number of filtered donor units. As used herein, the term "satisfactory observation" refers to an observation of a donor unit at a point along a given dimension where a measurement/observation also exists for the target unit at the same point along the same dimension. As one example, assuming observations are taken over the dimension of time (i.e., measured over time), if a donor unit has observations taken at times $t_0$ to $t_{100}$ and the target unit has observations taken at times $t_0$ to $t_{99}$, then only the donor unit's observations between times to $t_0$ $t_{99}$ are said to be satisfactory for the purpose of identifying observations associated with common interventions between target unit and the relevant donor units. Next, data preparation submodule 108 can populate first intermediate table 116a to include data pertaining to the common interventions associated with the target unit and filtered donor units from the previous step. Data preparation submodule 108 can also populate second intermediate table 116b to include data pertaining to the interventions associated with the filtered donor units under the subject intervention. In some embodiments, data preparation submodule 108 can create intermediate tables 116a, 116b prior to populating them. In other embodiments, intermediate tables 116a, 116b may be pre-existing.

Data validation submodule 110 can validate the data prepared by data preparation submodule 108 using one or more diagnostic tests. For example, data validation submodule 110 may create/populate a third intermediate table 116c that concatenates data prepared by data preparation submodule 108 (e.g., data within the first and second intermediate tables 116a, 116b) in a column-wise manner and then perform a singular value decomposition of the concatenated data and inspect its spectral profile. If the data in the third intermediate table 116c does not exhibit low-dimensional structure, then it may need to be pre-processed, e.g., by applying an autoencoder identify a new low-dimensional representation of the data in the third intermediate table 116c. In some embodiments, data validation submodule 110 may perform a subspace inclusion hypothesis test on data prepared by data preparation submodule 108. If the hypothesis test passes, then data validation submodule 110 may determine whether or not accurate synthetic data can be generated for the target unit under the subject intervention. If it is determined that accurate synthetic data can be generated, SI module 102 may proceed to generate and output synthetic data as described next. Otherwise, SI module 102 may output an indication (e.g., an error signal or message) that accurate synthetic data cannot be generated based on the data available in observations database 104.

Synthetic data generation submodule 112 may generate SI data by choosing a pre-defined training error tolerance $\varepsilon$ and then following the synthetic data generation procedure described below Sections 3 and 9. Briefly, synthetic data generation submodule 112 can generate a learned model using data in the first intermediate table 116a. The learned model may represent to a relationship (e.g., a unique minimum-norm linear relationship) between the target unit and the filtered donor units. Various types of machine learning (ML) techniques can be used to generate the learned model as described below. Next, data generation submodule 112 can apply the learned model to the data in the second intermediate table 116b to generate SI data corresponding to an outcome of the target unit under the subject intervention. The generated SI data can be stored in SI database 106. In some embodiments, generated SI data may be transmitted, exported, or otherwise provided to another system (e.g., a remote system) where it can be used to assist with, or automate, various decision-making processes. For example, system 100 can transmit generated SI data to one or more online commerce platforms where the data can be used to decide which types or promotions should be targeted to which types of customers. As another example, system 100 can transmit generated SI data to personalized medicine system/platform where the data can be used to decide which among different drug therapies is better for a given patient or group of patients. In some embodiments, observations database 104 may be populated from the same other system (s) such that both the input and output of system 100 are connected to the other system(s). In some embodiments, system 100 may include an application programming interface (API) via which the other system(s) can send observations data to system 100 and/or retrieve generated SI data from system 100.

Accuracy diagnostics submodule 114, which may be omitted in some embodiments, can determine, generally, the accuracy steps performed by submodules 108-112 and/or, in particular, the accuracy of the SI data generated by submodule 112 in conjunction with submodules 108, 110. In some embodiments, accuracy diagnostics submodule 114 can perform "cross-validation" to investigate whether the steps described above are successful in recreating one or more observed datasets from observations database 104. More formally, each donor unit may be iteratively assigned to be the target unit, and the remaining donor units may then be used to form the donor group for that particular iteration. That is, in this case, the temporary target unit's observations can be observed under the subject intervention (i.e., have access to the "synthetic" data one is trying to reproduce). The same procedure described above can then be carried out with the extra validation of measuring the prediction error between the generated SI data (i.e., the data generated by applying the learned model to the second intermediate table 116b populated using the temporary donor group, and the observations associated with the temporary target unit under the subject intervention.

1. Formal Description

A formal description of SI structures and techniques is now provided. Such structures and techniques can be implemented, for example, within the system 100 of FIG. 1.

Some standard notation used herein is now discussed. For a matrix $A \in \mathbb{R}^{a \times b}$, denote its transpose as $A' \in \mathbb{R}^{b \times a}$. Denote the operator (spectral) and Frobenius norms of A as $\|A\|_{op}$ and $\|A\|_F$, respectively. The columnspace (or range) of A is the span of its columns, which is denoted as $\mathcal{R}(A) = \{v \in \mathbb{R}^a : v = Ax, x \in \mathbb{R}^b\}$. The rowspace of A, given by $\mathcal{R}(A')$, is the span of its rows. Recall that the nullspace of A is the set of vectors that are mapped to zero under A. For any vector $v \in \mathbb{R}^a$, let $\|v\|_p$ denote its $\ell_p$-norm. Further, define the inner product between vectors $v, x \in \mathbb{R}^a$ as $\langle v, x \rangle = \sum_{\ell=1}^{a} v_\ell x_\ell$. If v is a random variable, define its sub-Gaussian (Orlicz) norm as $\|v\|_{\psi_2}$. Let $[a] = \{1, \ldots, a\}$ for any integer a.

Let f and g be two functions defined on the same space. In this disclosure, it is said that $f(n) = O(g(n))$ if and only if there exists a positive real number M and a real number $n_0$ such that for all $n \geq n_0$, $|f(n)| \leq M|g(n)|$. Analogously one can say: $f(n) = \Theta(g(n))$ if and only if there exists positive real numbers m, M such that for all $n \geq n_0$, $m|g(n)| \leq |f(n)| \leq M|g(n)|$; $f(n) = o(g(n))$ if for any $m > 0$, there exists $n_0$ such that for all $n \geq n_0$, $|f(n)| \leq m|g(n)|$.

The following formal description adopts the standard notations and definitions for stochastic convergences. As such, denote $$\xrightarrow{d} \text{ and } \xrightarrow{p}$$

as convergences in distribution and probability, respectively. This disclosure also makes use of $O_p$ and $o_p$, which are probabilistic versions of the commonly used deterministic O and o notations. More formally, for any sequence of random vectors $X_n$, here it is said $X_n = O_p(a_n)$ if for every $\varepsilon > 0$, there exists constants $C_\varepsilon$ and $n_\varepsilon$ such that $C_\varepsilon(\|X_n\|_2 > \mathbb{P} a_n) < \varepsilon$ for every $n \geq n_\varepsilon$; equivalently, here it is said that $(1/a_n) X_n$ is "uniformly tight" or "bounded in probability". Similarly, $X_n = o_p(a_n)$ if for all $\varepsilon, \varepsilon' > 0$, there exists $n_\varepsilon$ such that $\mathbb{P}(\|X_n\|_2 > \varepsilon' a_n) < \varepsilon$ for every $n \geq n_\varepsilon$. Therefore, $$X_n = o_p(1) \Leftarrow X_n \xrightarrow{p} 0.$$

Additionally, this disclosure uses the "plim" probability limit operator: plim $$X_n = a \Leftarrow X_n \xrightarrow{p} a.$$

Here it is said that a sequence of events $\varepsilon_n$, indexed by n, holds "with high probability" (w.h.p.) if $\mathbb{P}(\varepsilon_n) \to 1$ as $n \to \infty$, i.e., for any $\varepsilon > 0$, there exists a $n_\varepsilon$ such that for all $n > n_\varepsilon$, $\mathbb{P}(\varepsilon_p) > 1 - \varepsilon$. More generally, a multi-indexed sequence of events $\varepsilon_{n_1, \ldots, n_d}$ with indices $n_1, \ldots, n_d$ with $d \geq 1$, is said to hold w.h.p. if $\mathbb{P}(\varepsilon_{n_1, \ldots, n_d}) \to 1$ as $\min\{n_1, \ldots, n_d\} \to \infty$. This disclosure also uses $\mathcal{N}(\mu, \sigma^2)$ to denote a normal or Gaussian distribution with mean $\mu$ and variance $\sigma^2$—here it is called standard normal or Gaussian if $\mu = 0$ and $\sigma^2 = 1$.

1.1. Problem Statement

Consider a panel data setting with $N \geq 1$ units, $T > 1$ time periods, and $D \geq 1$ interventions (or treatments). Throughout the following discussion, units are indexed with $n \in E[N] \{1, \ldots, N\}$, time is indexed with $t \in [T]$, and interventions are indexed with $d \in \{0, \ldots, D-1\}$. The causal framework of Neyman, J. (1923), "Sur les applications de la theorie des probabilites aux experiences agricoles: Essai des principes," and Rubin, D. B. (1974), "Estimating causal effects of treatments in randomized and nonrandomized studies," Journal of Educational Psychology, 66:688-701 can be followed where the random variable (r.v.) $Y_{tn}^{(d)} \in \mathbb{R}$ is denoted as the potential outcome of unit n at time t under intervention d. Denote d=0 as control, i.e., $Y_{tn}^{(0)}$ is the potential outcome for unit n at time t if no intervention occurs.

Figure 2:
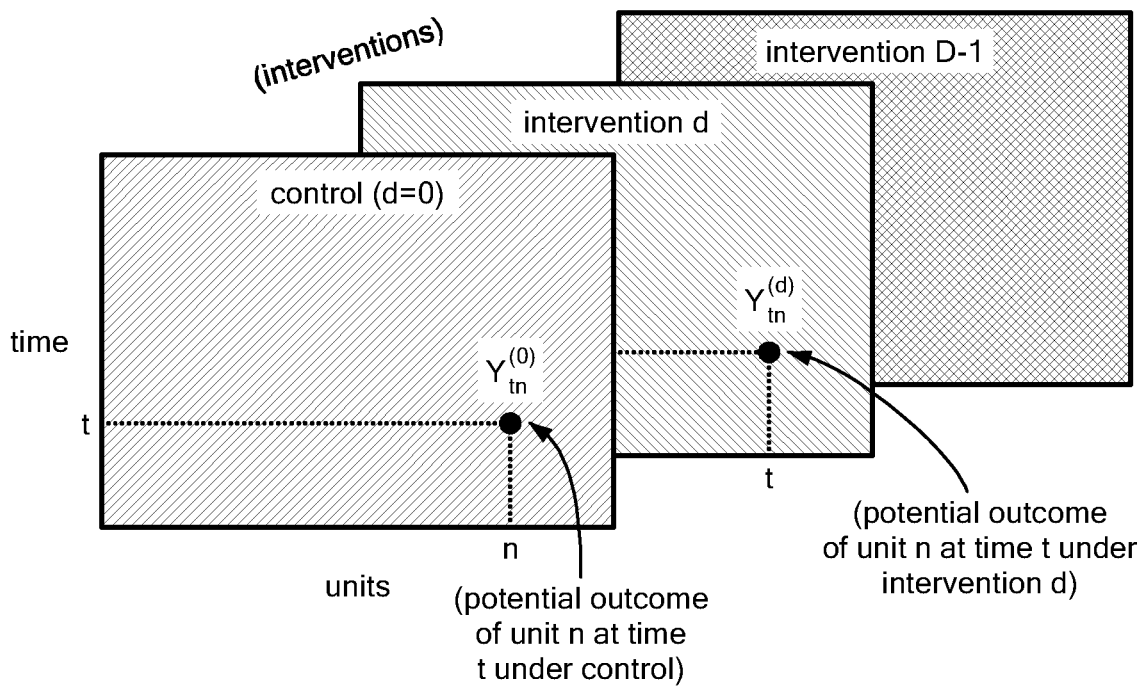
FIG. 2 is a diagram illustrating potential outcomes of N units over T time periods across D interventions encoded as a tensor.

FIG. 2 shows a graphical depiction of the various potential outcomes of interest. In more detail, FIG. 2 illustrates potential outcomes of N units over T time periods across D interventions encoded as a tensor.

Regarding pre- and post-intervention observations, consider a data setup similar to that considered in the SC literature. In particular, consider $T_0$ with $1 \leq T_0 < T$ as the intervention point, i.e., prior to $T_0$, all N units are under control, and after $T_0$, each unit receives exactly one of the D interventions (including control); define $T_1 = T - T_0$. This partitions the time horizon into a pre- and post-intervention period.

Figure 3:
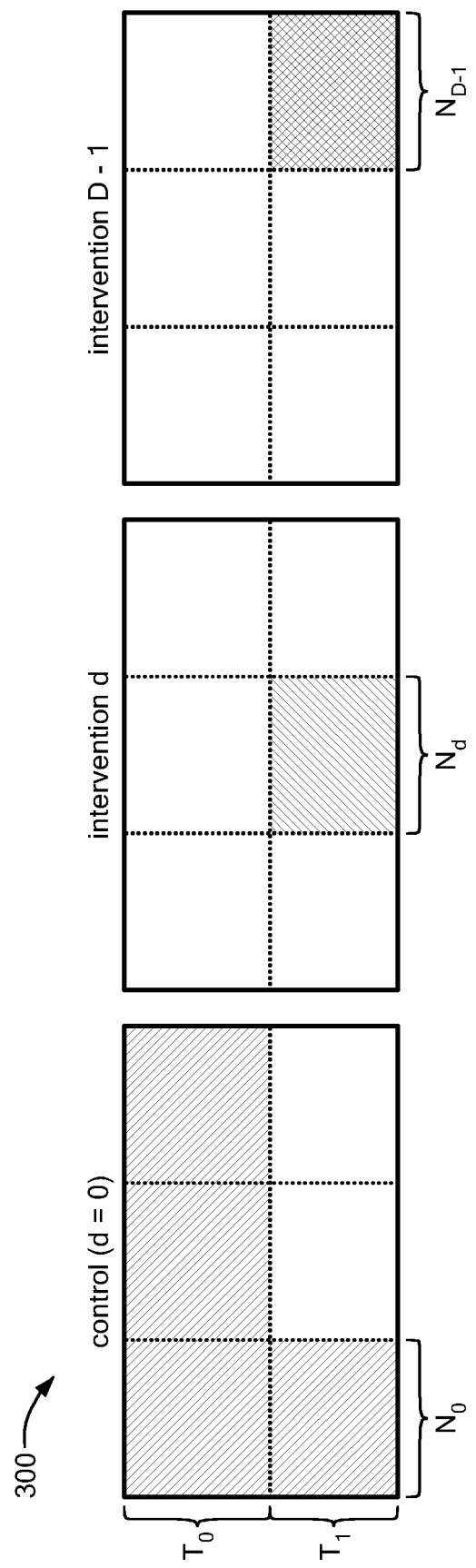
FIG. 3 is a graphical diagram illustrating observations for each unit.

FIG. 3 shows a graphical depiction of observation patterns. In the pre-intervention period, units under control are observed. In the post-intervention period, each unit under exactly one of the D interventions is observed. Notably, pre-intervention data associated with $d \neq 0$ is not observed.

Let the r.v. $D(n) \in \{0, \ldots, D-1\}$ denote the intervention assignment of unit n, and let the r.v. $\mathcal{D} = \{D(1), \ldots, D(N)\}$ denote the collection of intervention assignments across units. Group the units by the intervention they receive during the post-intervention period, i.e., the r.v. $\mathcal{J}^{(d)} = \{n : D(n) = d \text{ for } t > T_0\}$ denotes the subgroup of units that receive intervention d, and $N_d = |\mathcal{J}^{(d)}|$ denotes its size. For all d, observe that both $\mathcal{J}^{(d)}$ and $N_d$ are deterministic conditioned on $\mathcal{D}$. The observation of unit n at time t, denoted as $Y_{tn}$, obeys the following distributional assumption.

Assumption 1 (SUTVA): For each unit n, define $Y_{tn} = Y_{tn}^{(0)}$ for $t \leq T_0$, and $Y_{tn} = Y_{tn}^{(d)}$ for $t > T_0$ if $D(n) = d$.

A goal of the present disclosure is to estimate the causal parameter $\theta_n^{(d)}$, which represents unit n's potential outcomes under intervention d averaged over the post-intervention period. $\theta_n^{(d)}$ is formally defined in (2), given below.

A challenge in estimating $\theta_n^{(d)}$ vs. $\theta_n^{(0)}$ is the difference in data availability. Identification of $\theta_n^{(d)}$ across all (n,d) complements the existing SC literature, which focuses on estimating $\{\theta_n^{(0)} : n \notin \mathcal{J}^{(0)}\}$, i.e., the counterfactual average potential outcome under control for a treated unit, otherwise referred to as the treatment effect on the treated. In contrast, within the SI framework, even if unit n remains under control for $t > T_0$, it is of interest to produce its counterfactuals under any intervention $d \neq 0$. A question that arises is whether $\theta_n^{(d)}$ across (n,d) can be estimated by simply fitting $N \times D$ separate SC estimators, one for each pair. This is not possible since pre-intervention outcomes for each unit are only observed under control—refer to the data setup summarized in Assumption 1 and FIG. 3. This begs the pivotal question: "when does the structure between units under control continue to hold in other intervention regimes?" As discussed below, a factor model across time, units, and interventions (Assumption 2) provides one answer.

2. Causal Framework & Identification

Next, the SI causal framework is presented, the causal parameter of interest is formally introduced, and an identification result for this parameter is established.

2.1. Causal Framework & Identification

Certain causal assumptions made herein are stated below. One structural assumption is that the potential outcomes follow a latent factor model.

Assumption 2 (Latent factor model): For all (t, n, d), $$Y_{tn}^{(d)} = \langle u_t^{(d)}, v_n \rangle + \varepsilon_{tn}. \quad (1)$$

Here, the r.v. $u_t^{(d)} \in \mathcal{D}^r$ is a latent factor specific to a particular time t and intervention d; the r.v. $v_n \in \mathcal{D}^r$ is a latent factor specific to unit n (i.e., factor loading); r≥1 is the dimension of the latent space; and $\varepsilon_{tn} \in \mathcal{D}$ is the idiosyncratic shock for unit n at time t.

Of note, latent factors $\{u_t^{(d)}, v_n\}$ are unobserved. Further, $v_n$ is specific to unit n, i.e., each unit can have a different latent factor. An analogous statement holds for $u_t^{(d)}$ with respect to time t and intervention d.

Assumption 3 (Linear span inclusion): Given unit-intervention pair (n,d) and conditioned on $\mathcal{D}$, $v_n \in \text{span}(\{v_j : j \in \mathcal{J}^{(d)}\})$, i.e., there exists $w^{(n,d)} \in \mathcal{D}^{N_d}$ such that $$v_n = \Sigma_{j \in \mathcal{J}(d)} w_j^{(n,d)} v_j.$$

It can be seen that Assumption 2 "implies" Assumption 3. Given Assumption 2, Assumption 3 may be seen as rather weak. Consider the matrix of unit latent factors $[v_i : i \in \mathcal{J}^{(d)} \cup \{n\}] \in \mathcal{D}^{(N_d+1) \times r}$, where it is recalled that $v_i$ are r-dimensional. If $r = o(N_d)$, then by definition of matrix rank, Assumption 3 almost always holds. In the worst case, Assumption 3 fails for at most r−1 units. Practically, this requires that the intervention assignment $\mathcal{D}$ is such that sufficiently many units that undergo intervention d and they are collectively "diverse" enough.

Assumption 4 (Conditional mean independence): For all (t,n), conditioned on a particular sampling of the latent time-intervention and unit factors, let $\varepsilon_{tn}$ be mean independent of $\mathcal{D}$. Equivalently, $\mathbb{E}[\varepsilon_{tn} | \mathcal{LF}] = \mathbb{E}[\varepsilon_{tn} | \varepsilon] = 0$, where $$\mathcal{LF} := \{u_t^{(d)}, v_n : t \in [T], n \in [N], d \in \{0, \ldots, D-1\}\} \text{ and } \varepsilon := \{LF, D\}. \quad (2)$$

As an example, consider the following conditions: (i) $\mathbb{E}[\varepsilon_{tn} | LF] = 0$; (ii) $\varepsilon_{tn} \perp\!\!\!\perp D | \mathcal{LF}$. Together, they imply Assumption 4, i.e., Assumption 4 is weaker. These two conditions are herein discussed on $\varepsilon_{tn}$ as they may be more interpretable than Assumption 4. Since (i) is self-explanatory, the focus here is on (ii) and compare it with a standard analogous assumption in the literature known as "selection on observables". Conditioned on observable covariates corresponding to time, units, and/or interventions, "selection on observables" assumes that the potential outcomes are independent of the treatment assignments. Many identification arguments crucially rely on this conditional independence. Here, given Assumption 2 and conditioned on the latent factors $\mathcal{LF}$, the only remaining randomness in the potential outcome $Y_{tn}^{(d)}$ is due to $\varepsilon_{tn}$. Hence, (ii) implies that conditioned on the latent factors, the potential outcomes are independent of D. As such, these latent factors can be thought of as "unobserved covariates" and (ii) can be interpreted as "selection on latent factors".

In summary, assumptions 1 to 4 suggest that the observations are generated as follows:

1. Sample $\varepsilon$. It is noted that the latent factors and treatment assignments can be mutually dependent. That is, it may not be necessary to make any assumptions about the structure of their dependencies. However, it can be assumption that for each (n,d) pair of interest, the intervention assignment D is such that the set $\{v_j : j \in \mathcal{J}^{(d)}\}$ is "expressive" enough, i.e., $v_n$ lies within the linear span of this set (Assumption 3).
2. Sample $\varepsilon_{tn}$ across (t,n), where $\varepsilon_{tn}$ is mean independent of D (Assumption 4).

2.2. Target Causal Parameter & Identification

Below, the target causal parameter $\theta_n^{(d)}$ is formally defined, and the key identification result in Theorem 2.1 is stated.

For each (n,d), one may be interested in identifying and estimating $$\theta_n^{(d)} := \frac{1}{T_1} \sum_{t > T_0} \mathbb{E}[Y_{tn}^{(d)} | \{u_t^{(d)}, v_n : t > T_0\}], \quad (3)$$

unit n's expected potential outcomes under intervention d averaged over the post-intervention period. The expectation in (3) is taken over $\varepsilon_{tn}$ for $t > T_0$, and is conditioned on unit n's specific latent factor $v_n$ and the time-intervention latent factors $\{u_t^{(d)} : t > T_0\}$.

Regarding identification, it can be established that for each (n,d) pair, given knowledge of $w^{(n,d)}$, it is feasible to identify the causal parameter $\theta_n^{(d)}$ under Assumptions 1 to 4. Moreover, a stronger result can be proved—the identification of $\mathbb{E}[Y_{tn}^{(d)} | u_t^{(d)}, v_n]$ for any t.

Theorem 2.1: For a given unit-intervention pair (n,d), let Assumptions 1 to 4 hold. Then, given knowledge of $w^{(n,d)}$, one has $$\mathbb{E}[Y_{tn}^{(d)} | u_t^{(d)}, v_n] = \sum_{j \in \mathcal{J}(d)} w_j^{(n,d)} \mathbb{E}[Y_{tj} | \varepsilon] \text{ for all } t, \quad (4)$$

$$\theta_n^{(d)} = \frac{1}{T_1} \sum_{t > T_0} \sum_{j \in \mathcal{J}(d)} w_j^{(n,d)} \mathbb{E}[Y_{tj} | \varepsilon]. \quad (5)$$

As a consequence of Theorem 2.1, one has $\mathbb{E}[Y_{tn}^{(d)}] = \mathbb{E}[\Sigma_{j \in \mathcal{J}} w_j^{(n,d)} Y_{tj}]$, where the expectation is now taken over $\varepsilon_{tn}$ and $\varepsilon$, i.e., no longer conditioned on the latent factors and the treatment assignment. This relation follows from (3) and the tower law for expectations, i.e., for any two r.v.'s A and B, one has $\mathbb{E}[A] = \mathbb{E}[\mathbb{E}[A|B]]$.

3. Synthetic Interventions Estimator

Theorem 2.1 allows one to express $\theta_n^{(d)}$ in terms of a linear combination of observed quantities $\{Y_{tj} : t > T_0, j \in \mathcal{J}^{(d)}\}$ in expectation. The coefficients associated with this linear combination are denoted by the vector $w^{(n,d)}$. This is the key quantity that needs to be estimated, which in turn, allows $\theta_n^{(d)}$ to be estimated. One such estimator is provided below; without loss of generality, a particular (n,d) pair is considered.

More notation is now discussed. Throughout this disclosure, let $Y_{pre,n} = [Y_{tn} : t \leq T_0] \in \mathbb{R}^{T_0}$ represent the vector of pre-intervention outcomes for unit n. Let $Y_{pre,\mathcal{J}(d)} = [Y_{tj} : t \leq T_0, j \in \mathcal{J}^{(d)}] \in \mathbb{R}^{T_0 \times N_d}$ and $Y_{post,\mathcal{J}(d)} = [Y_{tj} : t > T_0, j \in \mathcal{J}^{(d)}] \in \mathbb{R}^{T_1 \times N_d}$ represent the pre- and post-intervention outcomes, respectively, associated with the units within $\mathcal{J}^{(d)}$. Define the singular value decomposition (SVD) of $Y_{pre,\mathcal{J}(d)}$ as $$Y_{pre,\mathcal{J}(d)} = \Sigma_{\ell=1}^{M} \hat{s}_\ell \hat{u}_\ell \hat{v}_\ell', \quad (6)$$

where $M = \min\{T_0, N_d\}$, $\hat{s}_\ell \in \mathbb{R}$ are the singular values (arranged in decreasing order), and $\hat{u} \hat{u}_\ell \in \mathbb{R}^{T_0}, \hat{v}_\ell \in \mathbb{R}^{N_d}$ are the left and right singular vectors, respectively.

3.1. Estimating the Causal Parameter

The SI estimator is a two-step procedure with only one hyper-parameter $k \in [M]$ that quantifies the number of singular components of $Y_{\text{pre}, \mathcal{J}^{(d)}}$ to retain.

1. Estimating $w^{(n,d)}$:

$$\hat{w}^{(n,d)} = (\sum_{\ell=1}^{k} (1/\hat{s}_\ell) \hat{v}_\ell \hat{u}_\ell^t) Y_{\text{pre},n}. \quad (7)$$

2. Estimating $\theta_n^{(d)}$:

$$\hat{\theta}_n^{(d)} = \frac{1}{T_1} \sum_{t>T_0} \sum_{j \in \mathcal{J}^{(d)}} \hat{w}_j^{(n,d)} Y_{tj}. \quad (8)$$

Regarding choosing k, there exist a number of principled heuristics to select the hyper-parameter k, and a few are discussed here. One standard data-driven approach is simply to use cross-validation, where the pre-intervention data is the training set and the post-intervention data is the validation set. Another standard approach is to use a "universal" thresholding scheme that preserves the singular values above a precomputed threshold. Finally, a "human-in-the-loop" approach is to inspect the spectral characteristics of $Y_{\text{pre}, \mathcal{J}^{(d)}}$, and choose k to be the natural "elbow" point that partitions the singular values into those of large and small magnitudes.

Figure 4:
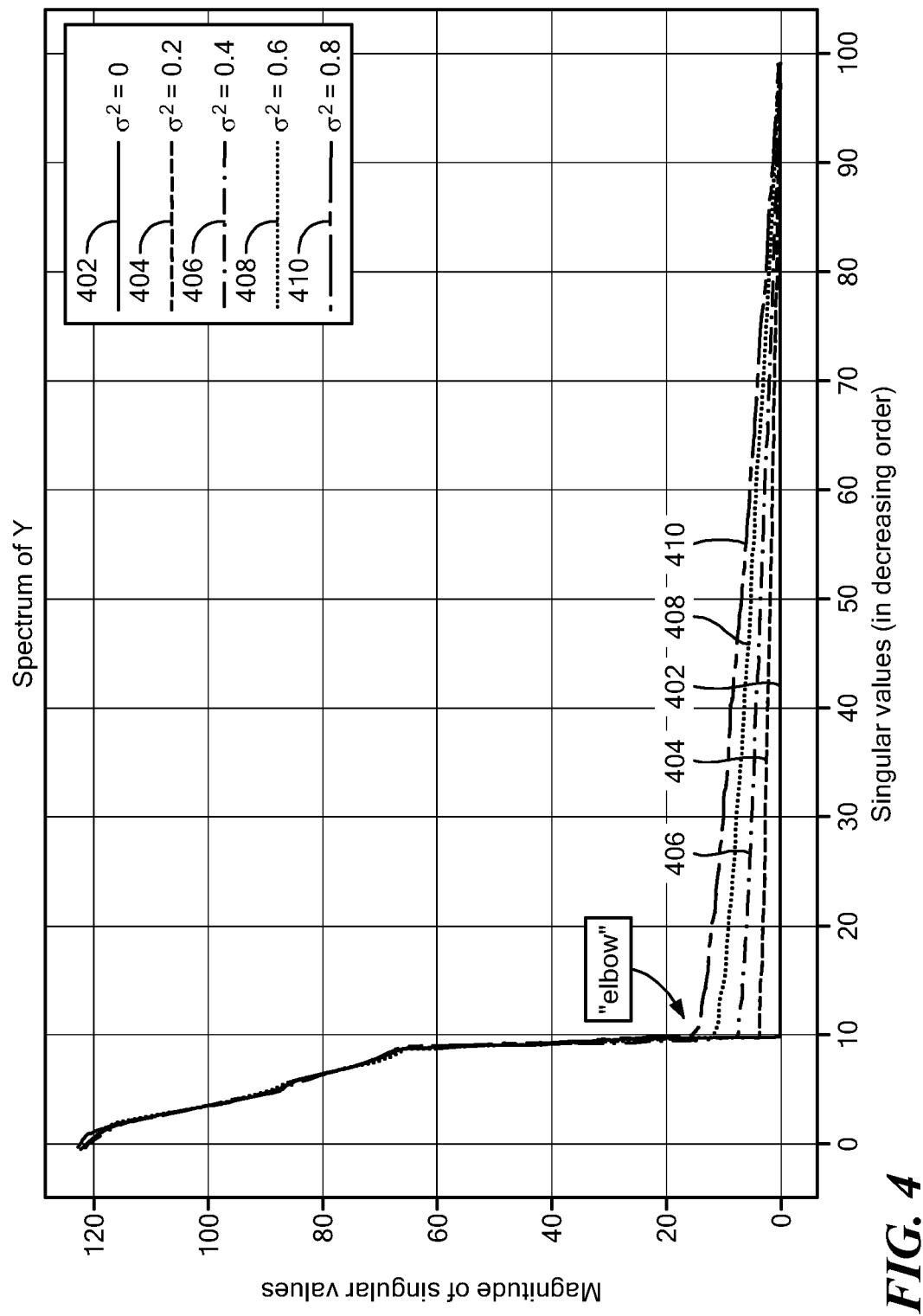
FIG. 4 is a plot of singular value magnitudes for different levels of noise according to a simulation of the structures techniques disclosed herein.

To understand the third approach, recall that $Y_{\text{pre}, \mathcal{J}^{(d)}} = \mathbb{E}[Y_{\text{pre}, \mathcal{J}^{(d)}}] + E_{\text{pre}, \mathcal{J}^{(d)}}$ where $E_{\text{pre}, \mathcal{J}^{(d)}} = [\varepsilon_{tj} : t \leq T_0, j \in \mathcal{J}^{(d)}]$. Under the factor model in Assumption 3, $\mathbb{E}[Y_{\text{pre}, \mathcal{J}^{(d)}}]$ is low-rank. If the noise $\varepsilon_{tn}$ is reasonably well-behaved (i.e., has sufficiently light tails), then random matrix theory informs us that the singular values corresponding to the noise matrix $E_{\text{pre}, \mathcal{J}^{(d)}}$ are much smaller in magnitude compared to those of the signal matrix $\mathbb{E}[Y_{\text{pre}, \mathcal{J}^{(d)}}]$. Hence, it is likely that a "sharp" threshold or gap exists between the top singular values associated with $\mathbb{E}[Y_{\text{pre}, \mathcal{J}^{(d)}}]$ and the remaining singular values induced by $E_{\text{pre}, \mathcal{J}^{(d)}}$. For example, if the rows of $E_{\text{pre}, \mathcal{J}^{(d)}}$ are sub-Gaussian, then $\|E_{\text{pre}, \mathcal{J}^{(d)}}\|_{op} = O_p(\sqrt{T_0} + \sqrt{N_d})$. In comparison, if the entries of $\mathbb{E}[Y_{\text{pre}, \mathcal{J}^{(d)}}]$ are $\Theta(1)$ and its nonzero singular values $s_i$ are of the same magnitude, then $s_i = \Theta(\sqrt{T_0 N_d})$. For a more detailed exposition of assumptions on the spectra of $\mathbb{E}[Y_{\text{pre}, \mathcal{J}^{(d)}}]$, refer to Assumption 7. FIG. 4 shows a graphical depiction of the spectral gap.

FIG. 4 shows the spectrum of $Y = \mathbb{E}[Y] + E \in \mathbb{R}^{100 \times 100}$ according to a simulation. Here, $\mathbb{E}[Y] = UV'$, where the entries of $U, V \in \mathbb{R}^{100 \times 100}$ are sampled independently from $\mathcal{N}(0,1)$; further, the entries of E are sampled independently from $\mathcal{N}(0, \sigma^2)$ with $\sigma^2 \in \{0, 0.2, \ldots, 0.8\}$. In FIG. 4, curves 402, 404, 406, 408, and 410 correspond to $\sigma^2$ equal to 0.0, 0.2, 0.4, 0.6, and 0.6, respectively. Across varying levels of noise $\sigma^2$, there is a steep drop-off in magnitude from the top to remaining singular values—this marks the "elbow" point. As seen from FIG. 4, the top singular values of Y correspond closely with that of $\mathbb{E}[Y](\sigma^2=0)$, and the remaining singular values are induced by E. Thus, $(Y) = \approx (\mathbb{E}[Y]) = 10$.

Regarding the interpretation of an SI Estimator, recall from Theorem 2.1 that a goal is to estimate $w^{(n,d)}$, for which $\mathbb{E}[Y_{\text{pre}, \mathcal{J}^{(d)}}] = \mathbb{E}[Y_{\text{pre}, \mathcal{J}^{(d)}}] w^{(n,d)}$ holds. However, only the noisy instantiations $Y_{\text{pre},n}$ and $Y_{\text{pre}, \mathcal{J}^{(d)}}$ are accessible, where the noise is due to $\varepsilon_{tn}$. Nevertheless, it is appreciated herein that the approach given by (6), known as principal component regression (PCR), overcomes the challenge of estimating $w^{(n,d)}$ under measurement error. (The problem of learning from noisy covariate observations is known as "error-in-variables" regression.)

PCR is a two-stage procedure that (i) first applies principal component analysis to extract the low-dimensional signal captured by the top k singular components of $Y_{\text{pre}, \mathcal{J}^{(d)}}$, and (ii) then performs linear regression in the subspace spanned by these k components. If $k = (\mathbb{E}[Y_{\text{pre}, \mathcal{J}^{(d)}}])$ then the subspace spanned by the top k right singular vectors of $Y_{\text{pre}, \mathcal{J}^{(d)}}$ will be "close" to the row space of $\mathbb{E}[Y_{\text{pre}, \mathcal{J}^{(d)}}]$ via standard perturbation theory arguments. In particular, it is known that the distance between the two subspaces (distance between subspaces A and B is defined as $\|\mathcal{P}_A - \mathcal{P}_B\|_{op}$, where $\mathcal{P}_A$ is the projection matrix onto A) scales as $O_p$ ($\|E_{\text{pre}, \mathcal{J}^{(d)}}\|_{op}/s_{min}$), where $s_{min}$ is the smallest nonzero singular value of $\mathbb{E}[Y_{\text{pre}, \mathcal{J}^{(d)}}]$. In other words, PCR implicitly denoises $Y_{\text{pre}, \mathcal{J}^{(d)}}$ by exploiting the low-rank factor structure of $\mathbb{E}[Y_{\text{pre}, \mathcal{J}^{(d)}}]$.

Further, even with $\mathbb{E}[Y_{\text{pre}, \mathcal{J}^{(d)}}]$ were accessible, there remains an issue of identifiability of $w^{(n,d)}$ in the underdetermined (high-dimensional) case where $T_0 < N_d$. It is known, however, that the projection of $w^{(n,d)}$ onto the rowspace of $\mathbb{E}[Y_{\text{pre}, \mathcal{J}^{(d)}}]$, denoted as $\tilde{w}^{(n,d)}$, is not only unique, but is also the only relevant component for prediction. To see this, note that $\mathbb{E}[Y_{\text{pre}, \mathcal{J}^{(d)}}]\tilde{w}^{(n,d)} = \mathbb{E}[Y_{\text{pre}, \mathcal{J}^{(d)}}]w^{(n,d)}$. Further, it is noted that $\tilde{w}^{(n,d)}$ is the unique minimum $\ell_2$-norm vector for which this equality holds. This further reinforces the motivation for PCR since (7) enforces $\hat{w}^{(n,d)}$ to lie within the subspace spanned by the top k right singular vectors of $Y_{\text{pre}, \mathcal{J}^{(d)}}$. Thus, $\hat{w}^{(n,d)}$ will be close to the unique $\tilde{w}^{(n,d)}$, provided k is aptly chosen. This argument is formalized in Lemma 4.3.

4. Estimation and Inference of Causal Parameter

Below, the statistical accuracy (it is noted that all log factors within the results can be removed with careful analysis) of the estimate $\hat{\theta}_n^{(d)}$ is established. Section 4.1 lists additional assumptions needed to establish the results. In Section 4.2, the estimation error of the model parameter $w^{(n,d)}$) is bounded. In Sections 4.3 and 4.4, consistency and asymptotic normality of estimate $\hat{\theta}_n^{(d)}$ are established, respectively. Notably, in the specialized case where d=0, the results described herein contribute new inference guarantees to the SC literature as well.

More notation is now described. For any vector $v \in \mathbb{R}^a$, let $C(\|v\|_p) = \max\{1, \|v\|_p\}$, where $\|v\|_p$ denotes its $\ell_p$-norm. To simplify notation, dependencies on r and $\sigma$ are henceforth absorbed into the constant within $O_p$, which is defined above.

4.1. Additional Assumptions for the SI Estimator

Additional assumptions required to establish guarantees for the estimation procedure can be stated. Strictly speaking, these assumptions are not needed to establish identification of $\theta_n^{(d)}$ (Theorem 2.1), but are necessary for the estimator used in Section 3.1 to produce $\hat{\theta}_n^{(d)}$. These additional assumptions are in some sense "context-specific", i.e., they depend on the assumptions made on $\varepsilon_{tn}$ and the procedure chosen to estimate $w^{(n,d)}$. Since Assumptions 5 and 6 are standard and self-explanatory, focus is put on interpreting and justifying Assumptions 7 and 8 below. Towards this, recall the definition of $\varepsilon$, given in (2).

Assumption 5 (Sub-Gaussian shocks): Conditioned on $\varepsilon$, $\varepsilon_{tn}$ are independent sub-Gaussian r.v.s with $\mathbb{E}[\varepsilon_{tn}^2] = \sigma^2$ and $\|\varepsilon_{tn}\|_{\psi 2} \leq C\sigma$ for some constant $C > 0$.

Assumption 6 (Bounded support): Conditioned on $\varepsilon$, $\mathbb{E}[Y_{tn}^{(d)}] \in [-1,1]$. (The precise bound $[-1,1]$ is without loss of generality, i.e., it can be extended to $[a,b]$ for $a,b \in \mathbb{R}$ with $a \leq b$.)

Assumption 7 (Well-balanced spectra): Conditioned on $\varepsilon$ and given $\mathcal{J}^{(d)}$, the $r_{pre}$ nonzero singular values $s_i$ of $\mathbb{E}[Y_{\text{pre}, \mathcal{J}^{(d)}}]$ are well-balanced, i.e., $s_i^2 = \Theta(T_0 N_d / r_{pre})$.

Assumption 8 (Subspace inclusion): Conditioned on $\varepsilon$ and given $\mathcal{J}^{(d)}$, the rowspace of $\mathbb{E}[Y_{post,\mathcal{J}^{(d)}}]$ lies within that of $\mathbb{E}[Y_{pre,\mathcal{J}^{(d)}}]$, i.e., $\mathcal{R}(\mathbb{E}[Y'_{post,\mathcal{J}^{(d)}}]) \subseteq \mathcal{R}(\mathbb{E}[Y'_{pre,\mathcal{J}^{(d)}}])$.

Note $\Theta(\bullet)$ and $\mathcal{R}(\bullet)$ used in the Assumptions above were previously defined.

Assumption 7 requires that the nonzero singular values of the latent matrix, $\mathbb{E}[Y_{pre,\mathcal{J}^{(d)}}]$, are well-balanced. A natural setting in which Assumption 7 holds is if its elements $\mathbb{E}[Y_{tm}^{(d)}] = \Theta(1)$ and nonzero singular values satisfy $s_i^2 = \Theta(\zeta)$ for some $\zeta$. Then, for some absolute constant $C>0$, $$\Theta(T_0 N_d) = \|\mathbb{E}[Y_{pre,\mathcal{J}^{(d)}}]\|_F^2 = \Sigma_{i=1}^{r_{pre}} s_i^2 = C\zeta r_{pre}\zeta = \Theta(T_0 N_d/r_{pre}).$$

In effect, Assumption 7, or analogous versions to it, are pervasive across many fields. Within the econometrics factor model analyses and matrix completion literature, Assumption 7 is analogous to incoherence-style conditions. Additionally, Assumption 7 has been shown to hold w.h.p. for the canonical probabilistic generating process used to analyze probabilistic principal component analysis; here, the observations are assumed to be a high-dimensional embedding of a low-rank matrix with independent sub-Gaussian entries. Below, Lemma 4.1 further establishes that under Assumption 5, the singular values of $Y_{pre,\mathcal{J}^{(d)}}$ and $Y_{pre,\mathcal{J}^{(d)}}[\mathbb{E}]$ must be close.

Lemma 4.1: Let Assumptions 1, 2, 4, 5 hold. Then conditioned on $\varepsilon$, for any $t>0$ and $i \leq \min\{T_0, N_d\}$, $s_i - \hat{s}_i \leq C\sigma(T\sqrt{T_0} + \sqrt{N_d} + t)$ with probability at least $1 - 2\exp(-t^2)$, where $C>0$ is an absolute constant.

Hence, Assumption 7 can be empirically assessed by simply inspecting the spectra of $Y_{pre,\mathcal{J}^{(d)}}$; refer to FIG. 4 for a graphical depiction of the typical spectra of $Y_{pre,\mathcal{J}^{(d)}}$ and the existence of a natural elbow point. Further, a data-driven estimator for $\sigma$ is provided in (10), and its consistency is established in Lemma 4.4. Lastly, it is noted that the assumption of a gap between the top $r_{pre}$ of the population matrix $\mathbb{E}[Y_{pre,\mathcal{J}^{(d)}}]$ and the remaining singular values has been adopted in the econometrics literature of large dimensional factor analysis.

Regarding Assumption 8, in the SI framework, potential outcomes from different interventions are likely to arise from different distributions. Under Assumption 2, this translates to the latent time-intervention factors $u_t^{(d_1)}$ and $u_t^{(d_2)}$ for $d_1 \neq d_2$ being sampled from different distributions. This distribution shift presents a challenge in establishing guarantees for estimating $\theta_n^{(d)}$ as it invalidates the traditional i.i.d. assumptions between the pre- and post-intervention outcomes (i.e., train and test sets) required for standard generalization error analyses. Indeed, learning with distribution shifts is an active area of research in causal inference and beyond (e.g., transfer learning). Notably, this issue does not arise in the standard SC framework since the target causal parameter is $\theta_n^{(0)}$, and hence the model $\hat{w}^{(n,0)}$ is both learnt and applied on outcomes under control (i.e., same distribution). To accurately estimate $\theta_n^{(d)}$ despite the possible distribution shift, here it is shown that Assumption 8 suffices. In words, this disclosure may require that the rowspace of $\mathbb{E}[Y_{pre,\mathcal{J}^{(d)}}]$ is sufficiently "rich" relative to that of $\mathbb{E}[Y_{post,\mathcal{J}^{(d)}}]$. It is noted that Assumption 8 is a purely linear algebraic condition, i.e., no distributional assumptions are made on $v_n$ and $u_t^{(d)}$. If it is assumed that $u_t^{(d)}$ are sampled independently from an intervention-specific distribution, then one can verify that Assumption 8 holds w.h.p., indicating that it is not a particularly stringent condition.

As will be seen, Assumption 8 is the key condition that allows $\hat{w}^{(n,d)}$, learnt during the pre-intervention (training) period, to "generalize" to the post-intervention (testing) period. In Section 7, simulations are performed to show that $\hat{\theta}_n^{(d)}$ is an accurate estimate of $\theta_n^{(d)}$ even if the pre- and post-intervention outcomes come from different distributions, provided Assumption 8 holds; if it does not hold, then $\hat{\theta}_n^{(d)}$ is non-trivially biased. Given its importance, in Section 5, a data-driven hypothesis test is provided with provable guarantees to validate when Assumption 8 holds in practice. This hypothesis test can serve as an additional robustness check for the SC framework as well.

4.2. Model Learning

Assumption 8 enables the SI estimator to accurately learn the model parameter $w^{(n,d)}$. First, Lemma 4.2 establishes that $\theta^{(n,d)}$ can be expressed via $$\tilde{w}^{(n,d)} := V_{pre} V'_{pre} w^{(n,d)},$$

where $V_{pre}$ are the right singular vectors of $\mathbb{E}[Y_{pre,\mathcal{J}^{(d)}}]$.

Lemma 4.2: For a given unit-intervention pair (n,d), let the setup of Theorem 2.1 and Assumption 8 hold. Then, $$\theta_n^{(d)} = \frac{1}{T_1} \sum_{k>T_0} \sum_{j \in \mathcal{J}^{(d)}} \tilde{w}_j^{(n,d)} \mathbb{E}[Y_{tj} \mid \varepsilon].$$

Next, it is established that $\hat{w}^{(n,d)}$, given by (6), is a consistent estimate of $\tilde{w}^{(n,d)}$.

Lemma 4.3: For a given unit-intervention pair (n,d), let Assumptions 1 to 8 hold. Further, suppose $k = (\mathbb{E}[Y_{pre,\mathcal{J}^{(d)}}])$, where k is defined as in (6). Then, conditioned on $\varepsilon$, $$\hat{w}^{(n,d)} - \tilde{w}^{(n,d)} = O_p\left(\frac{c(\|\tilde{w}^{(n,d)}\|_2)\sqrt{\log(T_0 N_d)}}{\min\{\sqrt{T_0}, \sqrt{N_d}\}}\right). \quad (8)$$

Recall the definitions of $O_p$ and $C(\bullet)$ at the start of this section.

4.3. Finite-Sample Consistency

The following finite-sample guarantee establishes that the estimator described in Section 3 yields a consistent estimate of the causal parameter for a given unit-intervention pair.

Theorem 4.1: For a given unit-intervention pair (n,d), let Assumptions 1 to 8 hold. Suppose $k = (\mathbb{E}[Y_{pre,\mathcal{J}^{(d)}}])$, where k is defined as in (7). Then, conditioned on $\varepsilon$, $$\hat{\theta}_n^{(d)} - \theta_n^{(d)} = O_p\left(\frac{1}{T_0^{1/4}} + \frac{\|\tilde{w}^{(n,d)}\|_2}{\sqrt{T_1}} + \frac{C(\|\tilde{w}^{(n,d)}\|_1)\sqrt{\log(T_0 N_d)}}{\min\{\sqrt{T_0}, \sqrt{N_d}\}}\right).$$

4.4. Asymptotic Normality

Below, it established that the estimate is asymptotically normal around the true causal parameter. Then it is showed how to use this result to construct confidence intervals.

Theorem 4.2: For a given unit-intervention pair (n,d), let the setup of Theorem 4.1 hold. Suppose (i) $T_0, T_1, N_d \to \infty$; (ii) $(C(\|\tilde{w}^{(n,d)}\|_2))^2 \log(T_0 N_d) = o(\min\{T_0, N_d\})$; (iii)

$$T_1 = o\left(\min\left\{\sqrt{T_0}, \frac{\min\{T_0, N_d\}}{(C(\|\tilde{w}^{(n,d)}\|_1))^2 \log(T_0 N_d)}\right\}\right). \quad (9)$$

Then, conditioned on ε, $$\sqrt{T_1}\left(\hat{\theta}_n^{(d)} - \theta_n^{(d)}\right) \xrightarrow{d} \mathcal{N}(0, \sigma^2 \text{plim}\|\tilde{w}^{(n,d)}\|_2^2).$$

Ignoring dependencies on log factors and $\tilde{w}^{(n,d)}$, Theorem 4.2 establishes that if $T_1 = o(\min\{\sqrt{T_0}, N_d\})$, then $\hat{\theta}_n^{(d)}$ is asymptotically normally distributed around $\theta_n^{(d)}$. Effectively, this condition restricts the number of post-intervention (testing) measurements $T_1$ from growing too quickly with respect to the number of pre-intervention (training) measurements $T_0$ and the size of the donor subgroup $N_d$.

It is noted that the asymptotic variance scales with $\sigma^2$ and $\|\tilde{w}^{(n,d)}\|_2^2$. Recall that the former represents the variance of $\varepsilon_{tn}$ across all (t,n), while the latter measures the size of the projection of $w^{(n,d)}$ onto the rowspace of $\mathbb{E}[Y_{pre,\mathcal{J}^{(d)}}]$. Thus, the asymptotic variance scales with the underlying "model complexity" of the latent factors, given by ($\mathbb{E}[Y_{pre,\mathcal{J}^{(d)}}]$), which can be much smaller than the ambient dimension $N_d$.

4.4.1. Constructing Confidence Intervals

To construct confidence intervals, an estimate for the asymptotic variance may be required. Consistent with standard practice, $\sigma^2$ can be estimated using the pre-intervention error:

$$\hat{\sigma}^2 = \frac{1}{T_0}\|Y_{pre,n} - Y_{pre,\mathcal{J}^{(d)}}\hat{w}^{(n,d)}\|_2^2. \quad (10)$$

This estimator can be justified through the following lemma.

Lemma 4.4: Let Assumptions 1 to 7 hold. Suppose $k = (\mathbb{E}[Y_{pre,\mathcal{J}^{(d)}}])$, where k is defined as in (6). Then conditioned on ε, $$\hat{\sigma}^2 - \sigma^2 = O_p\left(\frac{1}{\sqrt{T_0}} + \frac{\|\tilde{w}^{(n,d)}\|_1^2 \log(T_0 N_d)}{\min\{T_0, N_d\}}\right).$$

Recall from Lemma 4.3 that $\|\tilde{w}^{(n,d)}\|_2$ can be estimated from $\|\tilde{w}^{(n,d)}\|_2$. Hence, $\hat{\sigma}\|\hat{w}^{(n,d)}\|_2$ is an accurate estimate of $\sigma\|\tilde{w}^{(n,d)}\|_2$. Coupling this estimator with Theorem 4.2, confidence intervals for the causal parameter can be crated in a straightforward manner. For example, a 95% confidence interval is given by $$\theta_n^{(d)} \in \left[\hat{\theta}_n^{(d)} \pm \frac{1.96 \cdot \hat{\sigma}\|\hat{w}^{(n,d)}\|_2}{\sqrt{T_1}}\right].$$

The "tightness" of this confidence interval is empirically assessed in Section 6.2.

5. SI Robustness Check: Subspace Inclusion Hypothesis Test

A key condition that enables the theoretical results in Section 4 is Assumption 8. Below, a data-driven hypothesis test to check when this condition holds is proven.

Additional notation is now discussed. Recall $r_{pre} = (\mathbb{E}[Y_{pre,\mathcal{J}^{(d)}}])$, and let $r_{post} = (\mathbb{E}[Y_{post,\mathcal{J}^{(d)}}])$. Recall $V_{pre} \in \mathbb{R}^{N_d \times r_{pre}}$ denotes the right singular vectors of $\mathbb{E}[Y_{pre,\mathcal{J}^{(d)}}]$; analogously, define $V_{post} \in \mathbb{R}^{N_d \times r_{post}}$ with respect to $\mathbb{E}[Y_{post,\mathcal{J}^{(d)}}]$. Let $\hat{V}_{pre} \in \mathbb{R}^{N_d \times r_{pre}}$ and $\hat{V}_{post} \in \mathbb{R}^{N_d \times r_{pre}}$ denote their respective estimates, which are constructed from the top $r_{pre}$ and $r_{post}$ right singular vectors of $Y_{pre,\mathcal{J}^{(d)}}$, $Y_{post,\mathcal{J}^{(d)}}$ respectively.

5.1 Hypothesis Test

Consider the following two hypotheses:

$H_0$: span($V_{post}$) ⊆ span($V_{pre}$) and $H_1$: span($V_{post}$) ⊈ span($V_{pre}$).

Define the test statistic as $\hat{t} = \|(I - \hat{V}_{pre}\hat{V}'_{pre})\hat{V}_{post}\|_F^2$. This yields the following test: for any significance level $\alpha \in (0,1)$, Retain $H_0$ if $\hat{t} \leq \tau(\alpha)$ if $\hat{t} \leq \tau(\alpha)$ and Reject $H_0$ if $\hat{t} > \tau(\alpha)$.

Here, $\tau(\alpha)$ is the critical value, which is herein defined for some absolute constant $C \geq 0$:

$$\tau(\alpha) = \frac{C\sigma^2 r_{post}\phi_{pre}^2(\alpha/2)}{s_{r_{pre}}^2} + \frac{C\sigma^2 r_{post}\phi_{post}^2(\alpha/2)}{\varsigma_{r_{post}}^2} + \frac{C\sigma r_{post}\phi_{pre}(\alpha/2)}{s_{r_{pre}}}, \quad (11)$$

where $\phi_{pre}(a) = \sqrt{T_0} + \sqrt{N_d} + \sqrt{\log(1/a)}$; $\phi_{post}(a) = \sqrt{T_1} + \sqrt{N_d} + \sqrt{\log(1/a)}$; and $s_\ell$, $\varsigma_\ell$ are the $\ell$-th singular values of $\mathbb{E}[Y_{pre,\mathcal{J}^{(d)}}]$ and $\mathbb{E}[Y_{post,\mathcal{J}^{(d)}}]$, respectively.

5.2. Type I and Type II Error Guarantees

Given the choice of $\hat{\tau}$ and $\tau(\alpha)$, both Type I and Type II errors of the test are controlled.

Theorem 5.1: Let Assumptions 1, 2, 4, 5 hold. Fix any $\alpha \in (0,1)$. Then conditioned on ε, the Type I error is bounded as $\mathbb{P}(\hat{\tau} > \tau(\alpha)|H_0) \leq \alpha$. To bound the Type II error, suppose that the choice of C, given in (11), satisfies $$r_{post} > \|V_{pre}V'_{pre}V_{post}\|_F^2 + 2\tau(\alpha) + \frac{C\sigma r_{post}\phi_{post}(\alpha/2)}{\varsigma_{r_{post}}}, \quad (12)$$

which implies $H_1$ must hold. Then, the Type II error is bounded as $\mathbb{P}(\hat{\tau} \leq \tau(\alpha)|H_1) \leq \alpha$.

It is noted that the choice of C depends on the underlying distribution of $\varepsilon_{tn}$, and can be made explicit for certain classes of distributions. As an example, Corollary 5.1 specializes Theorem 5.1 to when $\varepsilon_{tn}$ are normally distributed.

Corollary 5.1: Consider the setup of Theorem 5.1 with C=4. Let $\varepsilon_{tn}$ be normally distributed. Then, $\mathbb{P}(\hat{\tau} > \tau(\alpha)|H_0) \leq \alpha$ and $\mathbb{P}(\hat{\tau} \leq \tau(\alpha)|H_1) \leq \alpha$.

Corollary 5.2 specializes Theorem 5.1 under Assumption 7.

Corollary 5.2: Let the setup of Theorem 5.1 hold. Suppose Assumption 7 holds. Further, suppose that conditioned on ε, the $r_{post}$ nonzero singular values $\zeta_i$ of $\mathbb{E}[Y_{post,\mathcal{J}^{(d)}}]$ are well-balanced, i.e., $\zeta_i^2 = \Theta(T_1 N_d/r_{post})$. Then, $$\tau(\alpha) = O\left(\frac{\sqrt{\log(1/\alpha)}}{\min\{\sqrt{T_0}, \sqrt{T_1}, \sqrt{N_d}\}}\right).$$

$\hat{\tau}$ can be interpreted as follows. Consider the noiseless case (i.e., $\varepsilon_{tn}=0$), where $V_{pre}$ and $V_{post}$ are perfectly observed. Conditioned on $H_0$, note that $\|(I-V_{pre}V'_{pre})V_{post}\|_F = 0$, while conditioned on $H_1$, $\|(I-V_{pre}V'_{pre})V_{post}\| > 0$. Hence, $\|(I-V_{pre}V'_{pre})V_{post}\|_F$ serves as a natural test statistic. Since these quantities are not observed, one can use $\hat{V}_{pre}$ and $\hat{V}_{post}$ as proxies.

$\tau(\alpha)$ can be interpreted as follows. Again, considering the noiseless case, it is noted that $\tau(\alpha)=0$. More generally, if the spectra of $\mathbb{E}[Y_{pre,\mathcal{J}^{(d)}}]$ and $\mathbb{E}[Y_{post,\mathcal{J}^{(d)}}]$ are well-balanced, then Corollary 5.2 establishes that $\tau(\alpha)=o(1)$, even in the presence of noise. Of note, Corollary 5.1 allows for exact constants in the definition of $\tau(\alpha)$ under the Gaussian noise model.

Condition in (12) can be interpreted as follows. It is noted that (12) is not a restrictive condition. Conditioned on $H_1$, observe that $r_{post} > \|V_{pre} V'_{pre} V_{post}\|_F^2$ always holds. If Assumption 7 holds and the nonzero singular values of $\mathbb{E}[Y_{post,\mathcal{J}^{(d)}}]$ are well-balanced, then the latter two terms on the right-hand side of (12) decay to zero as $T_0$, $T_1$, $N_d$ grow.

5.2.1. Computing $\tau(\alpha)$

Computing $\tau(\alpha)$ requires estimating (i) $\sigma^2$; (ii) $r_{pre}$, $r_{post}$; (iii) $s_{r_{pre}}$, $\zeta_{r_{post}}$. An estimator for $\sigma$ is given in (10) and its consistency is established in Lemma 4.4. Further, recall that Lemma 4.1 establishes that the singular values of $Y_{pre,\mathcal{J}^{(d)}}$ and $\mathbb{E} Y_{pre,\mathcal{J}^{(d)}}$ must be close. Thus, one can use the spectra of $Y_{pre,\mathcal{J}^{(d)}}$ as a good proxy to estimate $r_{pre}$ and $s_{r_{pre}}$. Analogous arguments hold for $YY_{post,\mathcal{J}^{(d)}}$ with respect to $\mathbb{E}[Y_{post,\mathcal{J}^{(d)}}]$.

A practical heuristic is now discussed. Here, a complementary approach to computing $\tau(\alpha)$ as used in the art is provided. To build intuition, observe that $\hat{\tau}$ represents the remaining spectral energy of $\hat{V}_{post}$ not contained within span $(\hat{V}_{pre})$. Further, note $\hat{\tau}$ is trivially bounded by $r_{post}$ since the columns of $\hat{V}_{post}$ are orthonormal. Thus, one can fix some fraction $\rho \in (0,1)$ and reject $H_0$ if $\hat{\tau} \leq \rho \cdot r_{post}$. In words, if more than $p$ fraction of the spectral energy of $\hat{V}_{post}$ lies outside the span of $\hat{V}_{pre}$, then the alternative test rejects $H_0$.

6. Simulations

In this section, illustrative simulations are presented to reinforce the theoretical results disclosed herein.

6.1. Consistency

This section demonstrates that the disclosed estimator is consistent and the rate of convergence matches the theoretical results (Theorem 4.1). In the process, the importance of Assumption 8 is shown in enabling successful estimation of $\theta_2^{(d)}$ in the SI causal framework.

6.1.1 Generative Model for Synthetic Data

Without loss of generality, consider the binary $D=2$ setting, i.e., $d \in \{0,1\}$, where the aim is to estimate $\theta_n^{(1)}$. Let $N_1 = |\mathcal{J}^{(1)}| = 200$ and $r=15$, where $r$ is defined in Assumption 2. Define the latent unit factors associated with $\mathcal{J}^{(1)}$ as $V_{\mathcal{J}^{(1)}} \in \mathbb{R}^{N_1 \times r}$ (refer to (1)), where its entries are independently sampled from a standard normal distribution.

Regarding pre-intervention data, choose $T_0 = 200$ and $r_{pre} = 10$. Define the latent pre-intervention time factors under control ($d=0$) as $U_{pre}^{(0)} \in \mathbb{R}^{T_0 \times r}$, which is sampled as follows: (i) let $A \in \mathbb{R}^{T_0 \times r_{pre}}$, where its entries are independently sampled from a standard normal; (ii) let $Q \in \mathbb{R}^{r_{pre} \times (r - r_{pre})}$, where its entries are first independently sampled from a uniform distribution over $[0,1]$, and then its columns are normalized to sum to one; (iii) define $U_{pre}^{(0)} = [A, AQ]$ as the concatenation of $A$ and $AQ$. By construction, $U_{pre}^{(0)}$ has rank $r_{pre}$ w.h.p., which is empirically verified. Next, define $\mathbb{E}[Y_{pre,\mathcal{J}^{(1)}}] = U_{pre}^{(0)} V'_{\mathcal{J}^{(1)}} \in \mathbb{R}^{T_0 \times N_1}$. Again, by construction, it is noted that $(\mathbb{E}[Y_{pre,\mathcal{J}^{(1)}}]) = r_{pre}$ w.h.p., which is empirically verified. Then, generate the model $w^{(n,1)} \in \mathbb{R}^{N_1}$ from a multivariate standard normal distribution, and define $\mathbb{E}[Y_{pre,n}] = \mathbb{E}[Y_{pre,\mathcal{J}^{(1)}}] w^{(n,1)} \in \mathbb{R}^{T_0}$.

Regarding post-intervention data, sample two sets of post-intervention time factors under $d=1$: one will obey Assumption 8, while the other will violate it. To begin, let $T_1 = 200$. Sample the former set as follows: (i) let $P \in \mathbb{R}^{T_1 \times T_0}$, where its entries are first independently sampled from a uniform distribution over $[0,1]$, and then its rows are normalized to sum to one; (ii) define $U_{post}^{(1)} = PU_{pre}^{(0)} \in \mathbb{R}^{T_1 \times r}$. Then, define $\mathbb{E}[Y_{post,\mathcal{J}^{(1)}}] = U_{post}^{(1)} V'_{\mathcal{J}^{(1)}} \in \mathbb{R}^{T_1 \times N_1}$. Next, generate the latter set as $F_{post}^{(1)} \in \mathbb{R}^{T_1 \times r}$, where its entries are independently sampled from a standard normal. Similar to before, define $\mathbb{E}[Z_{post,\mathcal{J}^{(1)}}] = F_{post}^{(1)} V'_{\mathcal{J}^{(1)}} \in \mathbb{R}^{T_2 \times N_1}$. To study the effect of the post-intervention period length, treat it as a variable. As such, define $\mathbb{E}[Y_{post,\mathcal{J}^{(1)}}(\rho)] \in \mathbb{R}^{\rho T_1 \times N_1}$ as the first $\rho T_1$ rows of $\mathbb{E}[Y_{post,\mathcal{J}^{(1)}}]$, where $\rho \in \{0.1, 0.2, \ldots, 1.0\}$. Analogously, one can define $\mathbb{E}[Z_{post,\mathcal{J}^{(1)}}(\rho)] \in \mathbb{R}^{\rho T_1 \times N_1}$ with respect to $\mathbb{E}[Z_{post,\mathcal{J}^{(1)}}]$. For every $\rho$, define $\theta_n^{(1)}(\rho)$ using $\mathbb{E}[Y_{post,\mathcal{J}^{(1)}}(\rho)]$ and $w^{(n,1)}$, and define $\vartheta_n^{(1)}(\rho)$ using $\mathbb{E}[Z_{post,\mathcal{J}^{(1)}}(\rho)]$ and $w^{(n,1)}$.

A motivation for the construction of $\mathbb{E}[Y_{pre,\mathcal{J}^{(1)}}]$, $\mathbb{E}[Y_{post,\mathcal{J}^{(1)}}]$, $\mathbb{E}[Y_{post,\mathcal{J}^{(1)}}]$, and $\mathbb{E}[Z_{post,\mathcal{J}^{(1)}}]$ is now presented. Recall that the SI framework allows potential outcomes from different interventions to be sampled from different distributions. As such, construct $\mathbb{E}[Y_{post,\mathcal{J}^{(1)}}]$ and $\mathbb{E}[Z_{post,\mathcal{J}^{(1)}}]$ such that they follow a different distribution to that of $\mathbb{E}[Y_{pre,\mathcal{J}^{(1)}}]$. This allows for studying when the model learnt using pre-intervention data "generalizes" to a post-intervention regime generated from a different distribution.

To highlight the impact of Assumption 8, it can be noted that by construction, Assumption 8 holds w.h.p. between $\mathbb{E}[Y_{post,\mathcal{J}^{(1)}}(\rho)]$ and $\mathbb{E}[Y_{pre,\mathcal{J}^{(1)}}]$ for every $\rho$. In contrast, by construction, $\mathbb{E}[Z_{post,\mathcal{J}^{(1)}}] = r$ w.h.p. Notably, since $r_{pre} < r$, Assumption 8 fails w.h.p. between $\mathbb{E}[Z_{post,\mathcal{J}^{(1)}}(\rho)]$ and $\mathbb{E}[Y_{pre,\mathcal{J}^{(1)}}]$ for every $\rho$. All three conditions are empirically verified.

Generate $Y_{pre,n}$ and $Y_{pre,\mathcal{J}^{(1)}}$ by adding independent noise entries from a normal distribution with mean zero and variance $\sigma^2 = 0.3$ to $\mathbb{E}[Y_{pre,n}]$ and $\mathbb{E}[Y_{pre,\mathcal{J}^{(1)}}]$, respectively. For every $\rho$, generate $Y_{post,\mathcal{J}^{(1)}}(\rho)$ and $Z_{post,\mathcal{J}^{(1)}}(\rho)$ by applying the same additive noise model to $\mathbb{E}[Y_{post,\mathcal{J}^{(1)}}(\rho)]$ and $\mathbb{E}[Z_{post,\mathcal{J}^{(1)}}(\rho)]$, respectively.

It is noted that the described data generating process ensures that Assumptions 1, 4, 5 hold. In addition, Assumptions 6 and 7 are empirically verified. Further, for Assumption 2, it is noted that the pre- and post-intervention (expected) potential outcomes associated with $\mathcal{J}^{(1)}$ were all generated using $V_{\mathcal{J}^{(1)}}$; thus, their variations only arise due to the sampling procedure for their respective latent time-intervention factors. Given that $\mathbb{E}[Y_{pre,n}]$, $\theta_n^{(1)}(\rho)$, and $\vartheta^{(1)}(\rho)$ were all defined using $w^{(n,1)}$, Assumption 3 holds.

6.1.2. Results

In the simulation, 100 iterations are performed for each $\rho$. The potential outcomes, $\mathbb{E}[Y_{pre,n}]$, $\mathbb{E}[Y_{pre,\mathcal{J}^{(1)}}]$, $\mathbb{E}[Y_{post,\mathcal{J}^{(1)}}(\rho)]$, $\mathbb{E}[Z_{post,\mathcal{J}^{(1)}}(\rho)]$, are fixed, but the idiosyncratic shocks are re-sampled every iteration to yield new (random) outcomes. For each iteration, use $(Y_{pre,n}, Y_{pre,\mathcal{J}^{(1)}})$ to learn $\hat{w}^{(n,1)}$, as given by (7). Then, use $Y_{post,\mathcal{J}^{(1)}}(\rho)$ and $\hat{w}^{(n,1)}$ to yield $\hat{\theta}_n^{(1)}(\rho)$, as given by (8). Similarly, use $Z_{post,\mathcal{J}^{(1)}}(\rho)$ and $\hat{w}^{(n,1)}$ to yield $\hat{\vartheta}_n^{(1)}(\rho)$. The mean absolute errors (MAEs), $|\hat{\theta}_n^{(1)}(\rho) - \theta_n^{(1)}(\rho)|$ and $|\hat{\vartheta}_n^{(1)}(\rho) - \vartheta_n^{(1)}(\rho)|$, are plotted in FIGS. 5A and 5B.

Figure 5A:
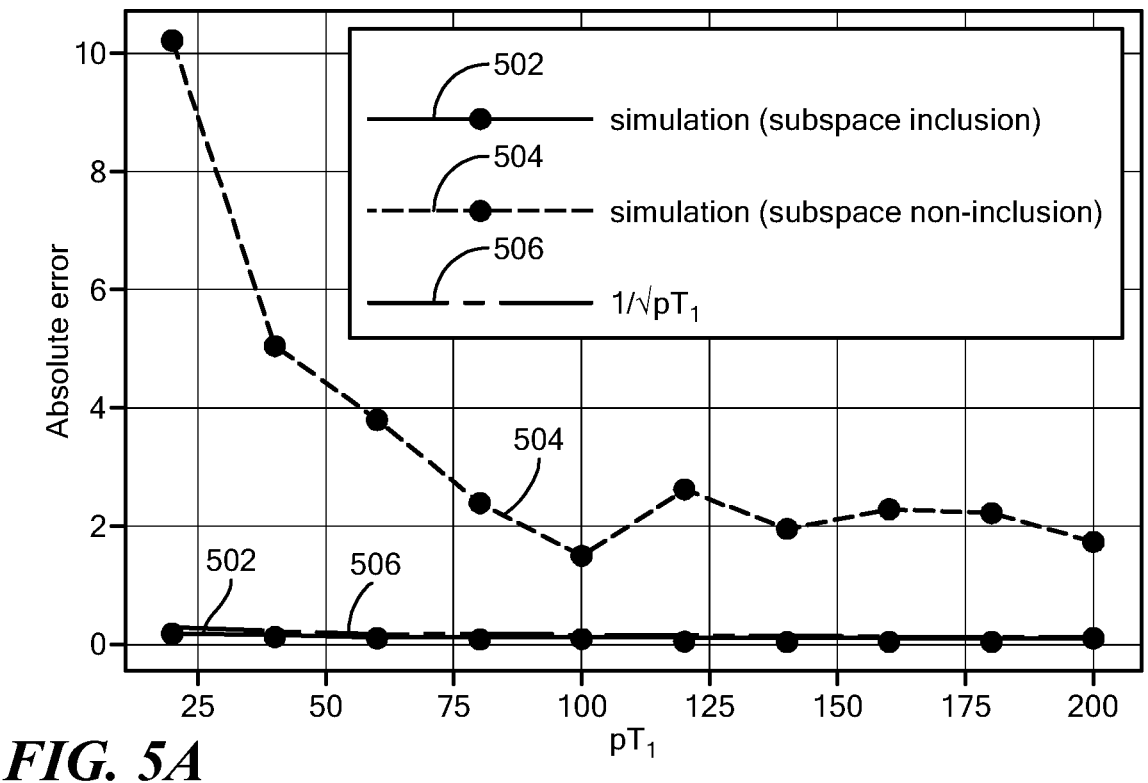
FIGS. 5A and 5B are plots of mean absolute errors according to a simulation of the structures and techniques disclosed herein.
Figure 5B:
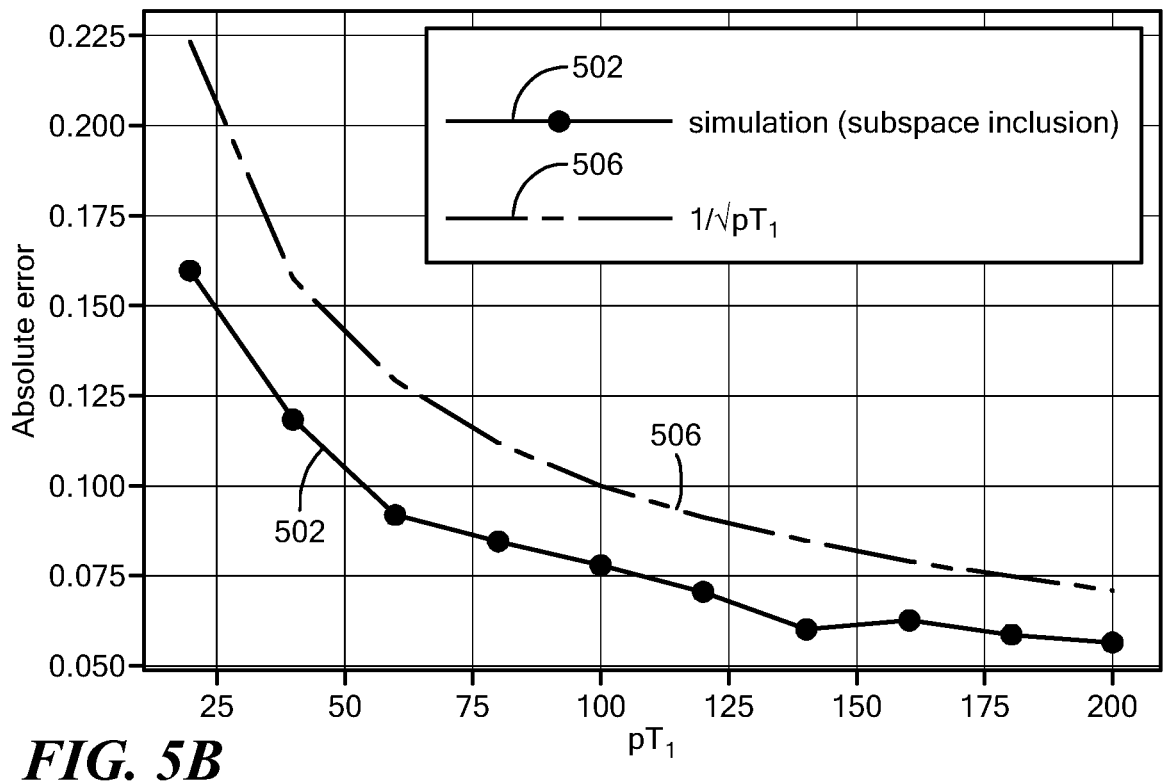

FIG. 5A shows a plot of mean absolute error when Assumption 8 holds. FIG. 5B shows a zoomed-in version of FIG. 5A. In FIGS. 5A and 5B, curve 502 represents when Assumption 8 holds and curve 504 represents when Assumption 8 fails across 100 iterations for every $\rho$, which corresponds to different post-intervention lengths. The error, represented by curve 506, decays as $O_p(1\rho T_1)$ when Assumption 8 holds, as implied by Theorem 4.1, but does not decay when Assumption 8 fails.

As FIGS. 5A and 5B show, the MAE of $\hat{\theta}_n^{(1)}(\rho)$ decays as the post-intervention period $\rho T_1$ increases. Moreover, given the choice of $T_0=N_d$, the error effectively scales as $O_p(1/\sqrt{\rho T_1})$, which matches the implication of Theorem 4.1. Meanwhile, the MAE of $\vartheta_n^{(1)}(\rho)$ is not only roughly eight times larger, but also does not decrease with $\rho T_1$. This simulation demonstrates that the estimator described in Section 3 produces a consistent estimate of the underlying causal parameter if Assumptions 1 to 8 hold, and also highlights the importance of Assumption 8 in enabling accurate estimation.

6.2. Asymptotic Normality Part I

In this section, it is demonstrated that estimate $\hat{\theta}_n^{(d)}$ is well-approximated by a Gaussian or Normal distribution centered around $\theta_n^{(d)}$, even if the pre- and post-intervention potential outcomes follow different distributions.

6.2.1. Generative Model for Synthetic Data

The binary D=2 intervention model is again considered. Of interest is estimating $\theta_n^{(d)}$ for $d \in \{0,1\}$. The data generating process will be such that when d=0, the pre- and post-intervention potential outcomes will obey the same distribution, and when d=1, they will obey different distributions. Nevertheless, a single learned model can be used to "generalize" to both post-intervention settings. As such, a single donor subgroup is be considered, but they are allowed to "undergo" two different interventions during the post-intervention phase. That is, $\mathcal{J}^{(0)} = \mathcal{J}^{(1)}$ with $N_0 = N_1 = 400$. Choosing r=15, define $V = V_{\mathcal{J}^{(0)}} = V_{\mathcal{J}^{(1)}} \in \mathbb{R}^{N_0 \times r}$, where its entries are independently sampled from a standard normal. It is noted that the same latent unit factors are used for both $\mathcal{J}^{(0)}$ and $\mathcal{J}^{(1)}$.

Regarding pre-intervention data, choose $T_0=400$, and define the latent pre-intervention time factors under control as $U_{pre}^{(0)} \in \mathbb{R}^{T_0 \times r}$, where its entries are sampled independently from a standard normal. Next, define $\mathbb{E}[Y_{pre, \mathcal{J}^{(0)}}] = \mathbb{E}[Y_{pre, \mathcal{J}^{(1)}}] = U_{pre}^{(0)} V' \in \mathbb{R}^{T_0 \times N_0}$. By construction, ($\mathbb{E}[Y_{pre, \mathcal{J}^{(0)}}]$)=r w.h.p., which is empirically verified. Then generate the model $w^{(n,0)} = w^{(n,1)} \in \mathbb{R}^{N_0}$ from a standard normal, and define $\mathbb{E}[Y_{pre,n}] = \mathbb{E}[Y_{pre, \mathcal{J}^{(0)}}] w^{(n,0)} \in \mathbb{R}^{T_0}$. Define $\tilde{w}^{(n,0)} = \tilde{w}^{(n,1)} = \mathbb{E}[Y_{pre, \mathcal{J}^{(0)}}]^\dagger \mathbb{E}[Y_{pre,n}]$, where $\dagger$ is the pseudo-inverse. Thus, the pre-intervention data associated with $\mathcal{J}^{(0)}$ and $\mathcal{J}^{(1)}$ are identical.

Regarding post-intervention data, choose $T_1=20$, and generate post-intervention time factors under d=0 and d=1. For d=0, define $U_{post}^{(0)} \in \mathbb{R}^{T_1 \times r}$, where its entries are independently sampled from a standard normal. For d=1, define $U_{post}^{(1)} \in \mathbb{R}^{T_1 \times r}$, where its entries are independently sampled uniformly over $[-\sqrt{3}, \sqrt{3}]$. Then define $\mathbb{E}[Y_{post, \mathcal{J}^{(0)}}] = U_{post}^{(0)} V' \in \mathbb{R}^{T_1 \times N_0}$ and $\mathbb{E}[Y_{post, \mathcal{J}^{(1)}}] = U_{post}^{(1)} V' \in \mathbb{R}^{T_1 \times N_1}$. It is noted again that both sets of potential outcomes use the same latent unit factors, and only differ in their post-intervention latent time factors to emulate different interventions. Finally, define $\theta_n^{(d)}$ using $\mathbb{E}[Y_{post, \mathcal{J}^{(d)}}]$ and $w^{(n,d)}$ for $d \in \{0,1\}$, and re-emphasize $w^{(n,0)} = w^{(n,1)}$.

Regarding the interpretation of the data generating process, it is noted that $\mathbb{E}[Y_{pre, \mathcal{J}^{(0)}}]$ and $\mathbb{E}[Y_{post, \mathcal{J}^{(0)}}]$ obey the same distribution to reflect that both sets of potential outcomes are associated with control. In contrast, $\mathbb{E}[Y_{pre, \mathcal{J}^{(1)}}]$ and $\mathbb{E}[Y_{post, \mathcal{J}^{(1)}}]$ follow different distributions to reflect that the pre- and post-intervention potential outcomes are associated with different interventions; the former with d=0 and the latter with d=1. However, by construction, both $\mathbb{E}[259]$ and $\mathbb{E}[Y_{post, \mathcal{J}^{(1)}}]$ satisfy Assumption 8 with respect to $\mathbb{E}[Y_{pre, \mathcal{J}^{(1)}}]$ IE w.h.p., which is empirically verified. Further, note the mean and variance of $\mathbb{E}[Y_{post, \mathcal{J}^{(0)}}]$, $\mathbb{E}[Y_{post, \mathcal{J}^{(1)}}]$ are identical.

Regarding observations, generate $Y_{pre,n}$ and $Y_{pre, \mathcal{J}^{(0)}} = Y_{pre, \mathcal{J}^{(1)}}$ by adding independent noise from a normal distribution with mean zero and variance $\sigma^2 = 0.5$ to $\mathbb{E}[Y_{pre,n}]$ and $\mathbb{E}[Y_{pre, \mathcal{J}^{(0)}}] = \mathbb{E}[Y_{pre, \mathcal{J}^{(1)}}]$, respectively. Generate $Y Y_{post, \mathcal{J}^{(d)}}$ by applying the same additive noise model to $\mathbb{E}[Y_{post, \mathcal{J}^{(d)}}]$ for $d \in \{0,1\}$.

As before, Assumptions 1 to 7 hold by construction.

6.2.2. Results

For each $d \in \{0,1\}$, perform 5000 iterations, where $\mathbb{E}[Y_{pre,n}]$, $\mathbb{E}[Y_{pre, \mathcal{J}^{(0)}}]$, $\mathbb{E}[Y_{post, \mathcal{J}^{(0)}}]$, and $\mathbb{E}[Y_{post, \mathcal{J}^{(1)}}]$ are fixed throughout, but the idiosyncratic shocks are re-sampled to generate new (random) outcomes. Within each iteration, first use $(Y_{pre,n}, Y_{pre, \mathcal{J}^{(0)}})$ to fit $\hat{w}^{(n,0)}$, as in (7). Since the pre-intervention observations are identical across d, it is highlighted that $\hat{w}^{(n,1)} = \hat{w}^{(n,0)}$. Next, use $Y_{post, \mathcal{J}^{(d)}}$ and $\hat{w}^{(n,0)}$ to yield $\hat{\theta}_n^{(d)}$ for each $d \in \{0,1\}$, as in (8). In other words, learn a single model $\hat{w}^{(n,0)}$ and apply it to two different post-intervention outcomes, $Y_{post, \mathcal{J}^{(0)}}$ and $Y_{post, \mathcal{J}^{(1)}}$.

Figure 6A:
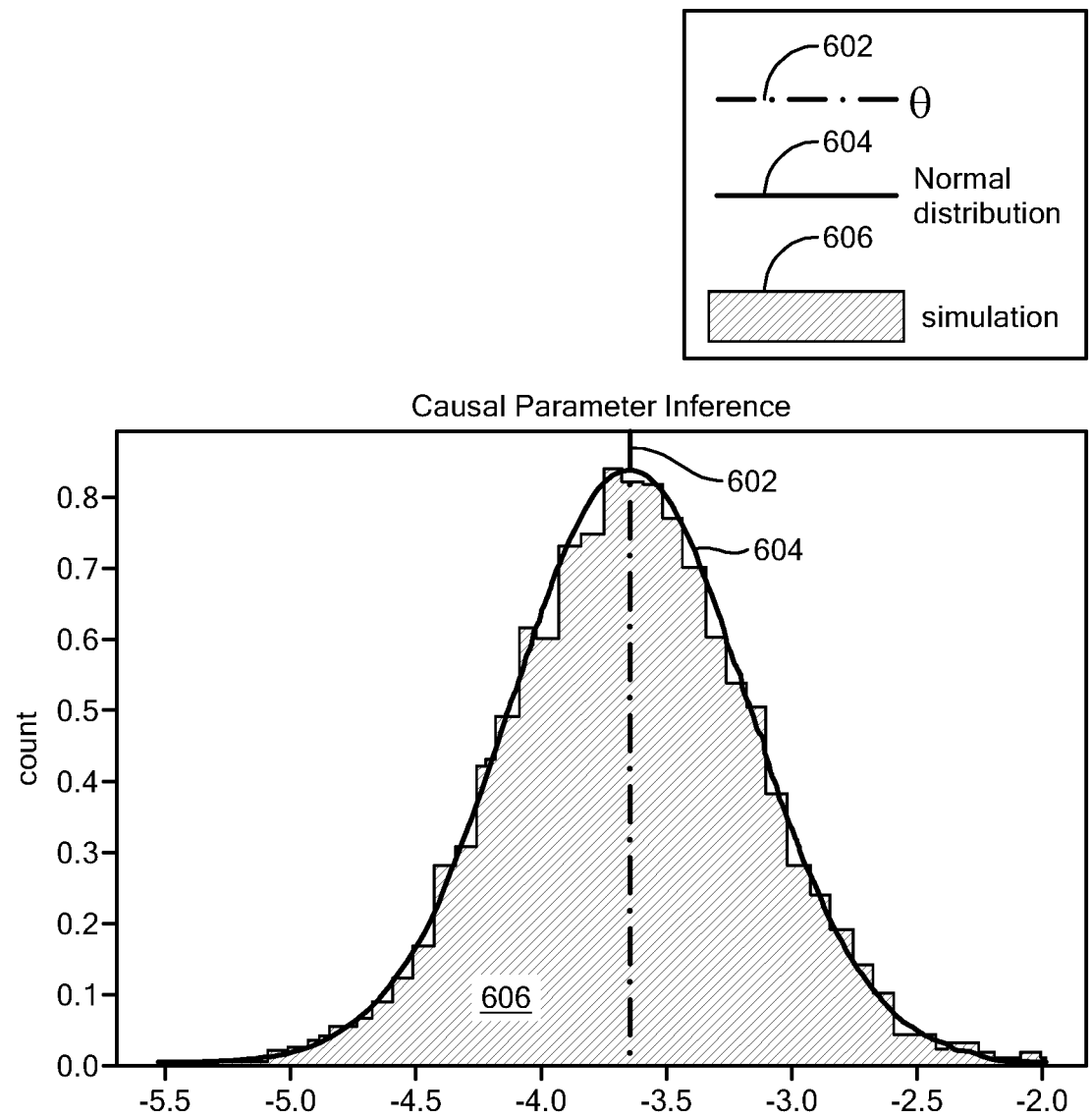
FIGS. 6A and 6B are histograms of $\hat{\theta}_n^{(0)}$ and $\hat{\theta}_n^{(1)}$, respectively, according to a simulation of the structures and techniques disclosed herein, and also show theoretical asymptotic normal distributions.
Figure 6B:
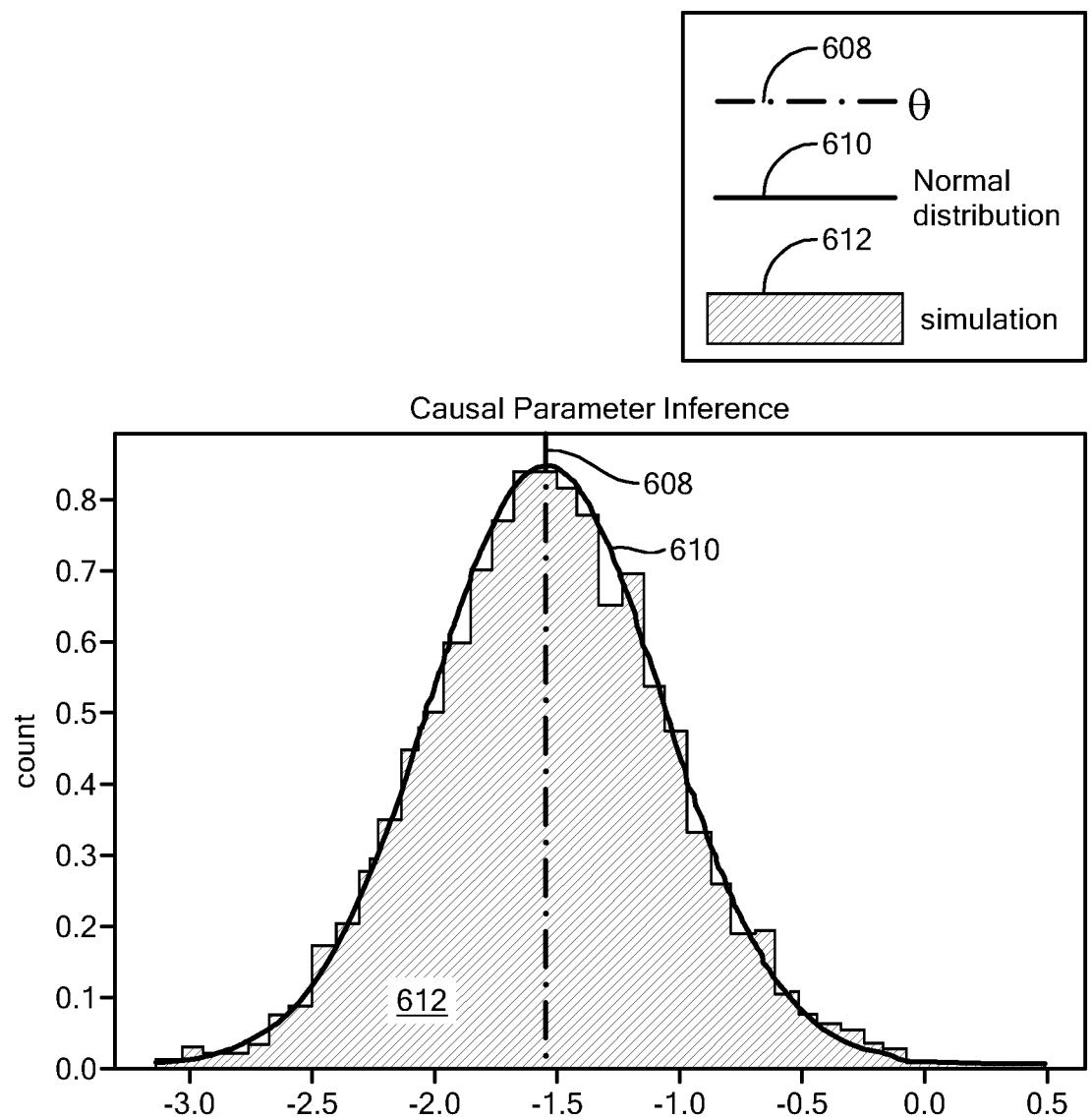

Histogram of estimates are displayed in FIGS. 6A and 6B. In more detail, FIG. 6A is a histogram of $\hat{\theta}_n^{(0)}$ 606 and its theoretical asymptotic normal distribution 604, where the mean is denoted 606. FIG. 6B is a histogram of $\hat{\theta}_n^{(1)}$ 612 and its theoretical asymptotic normal distribution 610, where the mean is denoted 608. As implied by Theorem 4.2, the histograms in FIGS. 6A and 6B are very well-approximated by a normal distribution with mean $\theta_n^{(d)}$ and variance $(1/\sqrt{T_1})\sigma^2 \|\tilde{w}^{(n,d)}\|_2^2$ for $d \in \{0,1\}$. Of note, the asymptotic variance is identical in both cases since $\tilde{w}^{(n,0)}$, but the means $\theta_n^{(d)}$ are different. These figures demonstrate that even if the pre- and post-intervention potential outcomes follow different distributions, the estimates remain normally distributed around the true causal parameter. In summary, these simulations show that under the SI framework, it is feasible to learn $\hat{w}^{(n,d)}$ under one intervention setting (e.g., control), and then transfer the learned model to a different intervention regime, which may obey a different distribution.

6.3. Asymptotic Normality Part II

Next, it is shown $\hat{\theta}_n^{(d)}$ is non-trivially biased when Assumption 8 fails.

6.3.1. Generative Model for Synthetic Data

Continuing analysis of the binary D=2 intervention model, let $N_1=400$, r=15, and generate $V_{\mathcal{J}^{(1)}} \in \mathbb{R}^{N_1 \times r}$ by independently sampling its entries from a standard normal.

Regarding pre-intervention data, choose $T_0=400$ and $r_{pre}=12$. Construct $\mathbb{E}[Y_{pre, \mathcal{J}^{(1)}}]$ using $V_{\mathcal{J}^{(1)}}$ identically to that in Section 6.1.1, such that ($\mathbb{E}[Y_{pre, \mathcal{J}^{(1)}}]$)=$r_{pre}$ w.h.p., which is empirically verified. As before, generate $w^{(n,1)} \in \mathbb{R}^{N_1}$ from a standard normal and define $\mathbb{E}[Y_{pre,n}] = \mathbb{E}[Y_{pre, \mathcal{J}^{(1)}}] w^{(n,1)} \in \mathbb{R}^{T_0}$, as well as $\tilde{w}^{(n,1)} = \mathbb{E}[Y_{pre, \mathcal{J}^{(1)}}]^\dagger \mathbb{E}[Y_{pre,n}]$.

Regarding post-intervention data, choose $T_1=20$, and define the post-intervention time factors under d=1 as $U_{post}^{(1)} \in \mathbb{R}^{T_1 \times r}$, where its entries are sampled independently from a standard normal. Next, define $\mathbb{E}[Y_{post, \mathcal{J}^{(1)}}] = U_{post}^{(1)} V_{\mathcal{J}^{(1)}}' \in \mathbb{R}^{T_1 \times N_1}$. By construction, ($\mathbb{E}[Y_{post, \mathcal{J}^{(1)}}]$)=r w.h.p., which is empirically verified. Since $r_{pre} < r$, Assumption 8 fails between $\mathbb{E}[Y_{pre, \mathcal{J}^{(1)}}]$ and $\mathbb{E}[Y_{post, \mathcal{J}^{(1)}}]$. Define $\theta_n^{(1)}$ using $\mathbb{E}[Y_{post, \mathcal{J}^{(1)}}]$ and $w^{(n,1)}$.

Regarding observations, generate $Y_{pre,n}$ and $Y_{pre, \mathcal{J}^{(1)}}$ by adding independent noise from a normal distribution with mean zero and variance $\sigma^2=0.5$ to $\mathbb{E}[Y_{pre,n}]$ and $\mathbb{E}[Y_{pre,\mathcal{J}^{(1)}}]$, respectively. Generate $Y_{post,\mathcal{J}^{(1)}}$ by applying the same noise model to $\mathbb{E}[Y_{post,\mathcal{J}^{(1)}}]$.

As before, Assumptions 1 to 7 hold by construction.

6.3.2. Results

Figure 7:
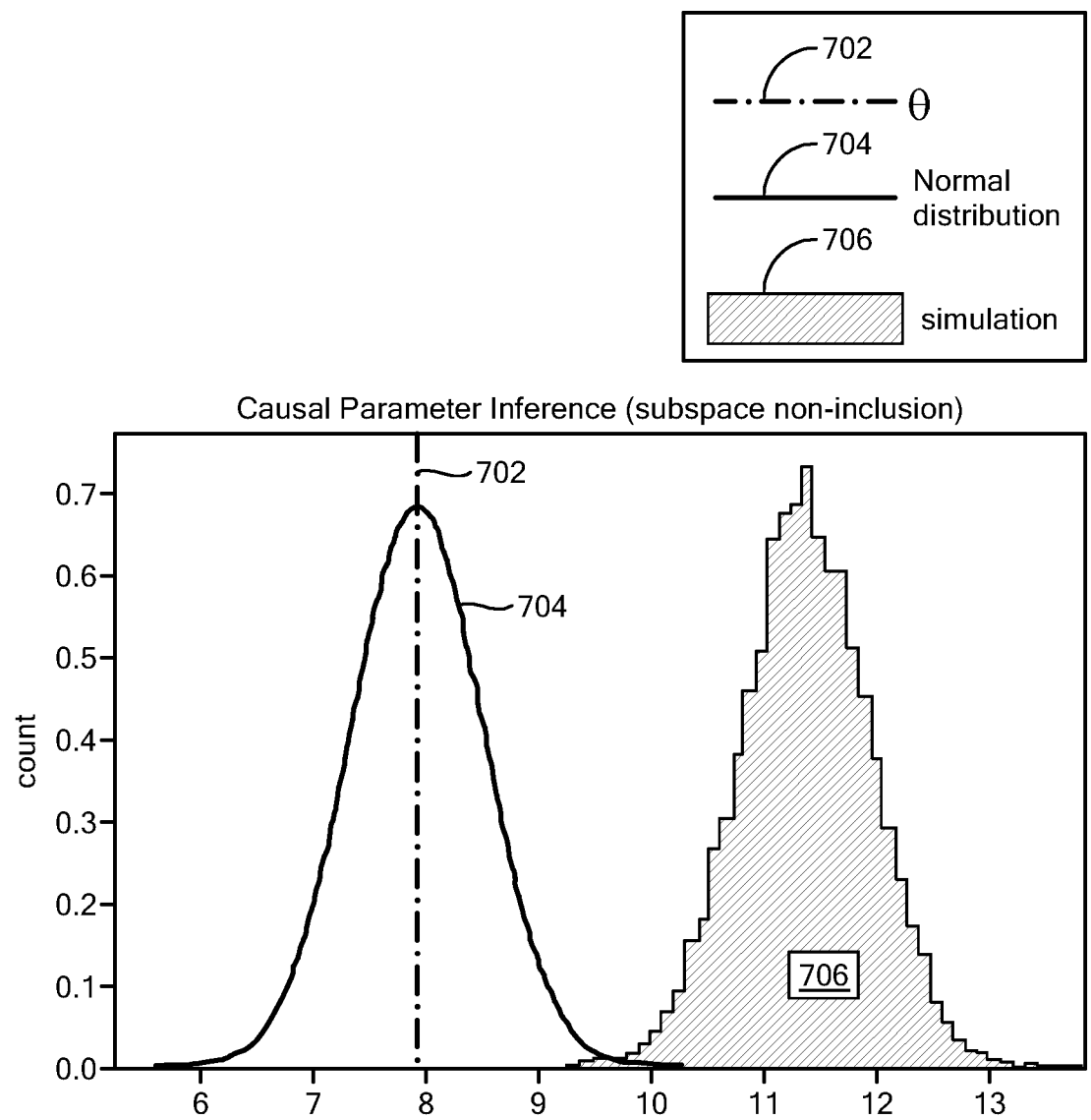
FIG. 7 is a histogram of $\hat{\theta}_n^{(1)}$ according to a simulation of the structures and techniques disclosed herein, and also shows a theoretical asymptotic normal distribution.

For this simulation, 5000 iterations are performed, where $\mathbb{E}[Y_{pre,n}]$, $\mathbb{E}[Y_{pre,\mathcal{J}^{(1)}}]$, $\mathbb{E}[Y_{post,\mathcal{J}^{(1)}}]$ are fixed, but the shocks are re-sampled. In each iteration, use $(Y_{pre,n}, Y_{pre,\mathcal{J}^{(1)}})$ to fit $\hat{w}^{(n,1)}$, and then use $Y_{post,\mathcal{J}^{(1)}}$ and $\hat{w}^{(n,1)}$ to yield $\hat{\theta}_n^{(1)}$. The resulting histogram 706 is displayed in FIG. 7 along with its theoretical asymptotic normal distribution 704 and mean 702. Unlike FIGS. 6A and 6B, the histogram of FIG. 7 is not well-approximated by the normal distribution with mean $\theta_n^{(1)}$ and variance $(1/\sqrt{T_1})\sigma^2\|\tilde{w}^{(n,1)}\|_2^2$, but has non-trivial bias. This reinforces the phenomena observed in FIGS. 6A and 6B and the importance of Assumption 8 for successful inference.

7. Empirics

Now considered is a case study exploring the effect of different discount strategies to increase user engagement in an A/B testing framework for a large e-commerce company, which can be anonymized due to privacy considerations. The results suggest the SI causal framework offers a useful perspective towards designing data-efficient A/B testing or randomized control trial (RCT). In particular, the SI framework allows one to selectively run a small number of experiments, yet estimate a personalized policy for each unit enrolled in the RCT.

For this case study, the company segmented its users into 25 groups (units), with approximately 10000 individual users per group, based on the historical time and money spent by a user on the platform. The aim of the company was to learn how different discount strategies (interventions) changed the engagement of each of the 25 user groups. The strategies were 10%, 30%, and 50% discounts over the regular subscription cost (control).

The A/B test was performed by randomly partitioning users in each of the 25 user groups into 4 subgroups; these subgroups corresponded to either one of the 3 discount strategies or a control group that received a 0% discount. User engagement in these 100 subgroups (25 user groups multiplied by 4 discount strategies) was measured daily over 8 days.

Of note, this web A/B testing case study is particularly suited to validate the SI framework as one can observe the engagement levels of each customer group under each of the three discounts and control, i.e., for each customer group, all four "counterfactual" trajectories are observed. As such, one has access to all potential outcomes, which can be encoded into a tensor $Y=[Y_m^{(d)}]\in \mathbb{R}^{8\times 25\times 4}$, where each slice $Y^{(d)}\in \mathbb{R}^{8\times 25}$ is a matrix of potential outcomes under discount d.

It can be seen that the operating assumptions in this work likely hold for this case study. First, Assumption 1 likely holds since the same discount d was applied to every subgroup of users within $\mathcal{J}^{(d)}$ and the discount one customer receives is unlikely to have an effect on another customer. Next, it is re-emphasized that the discounts were randomly assigned; hence, Assumption 4 holds (see the discussion in Section 2 for details). Moreover, the engagement levels were bounded, which implies Assumptions 5 and 6 hold.

Figure 8A:
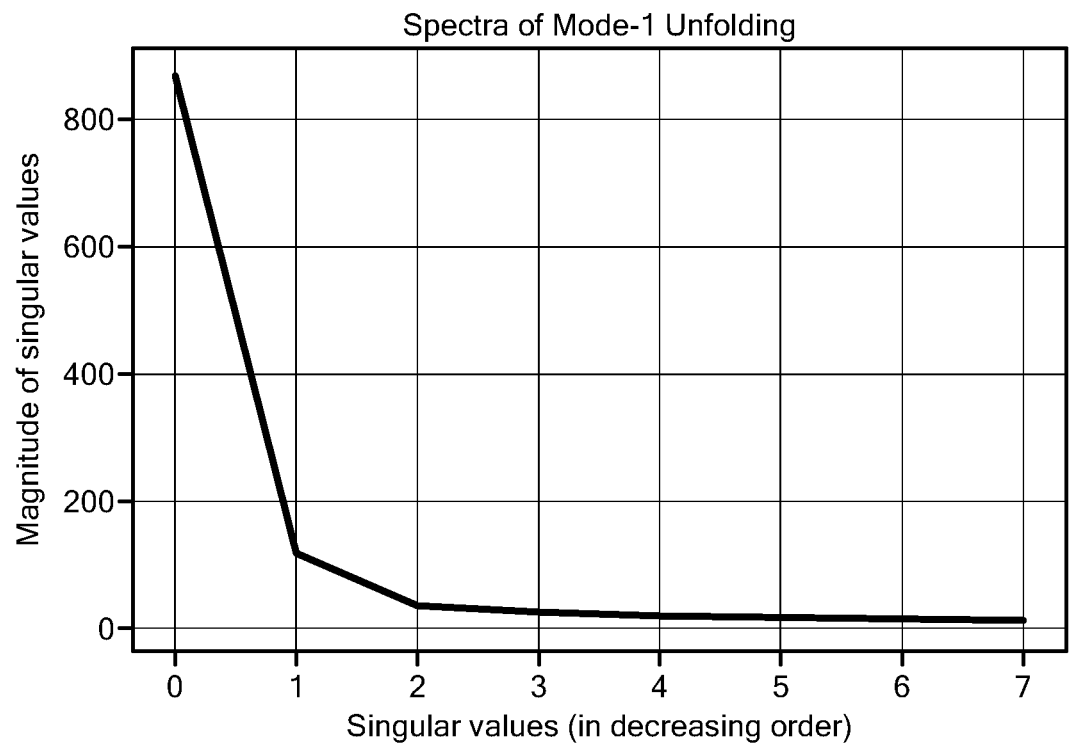
FIGS. 8A and 8B are plots showing spectra of mode-1 and mode-2 unfolding, respectively, according to an illustrative application of the structures and techniques disclosed herein.
Figure 8B:
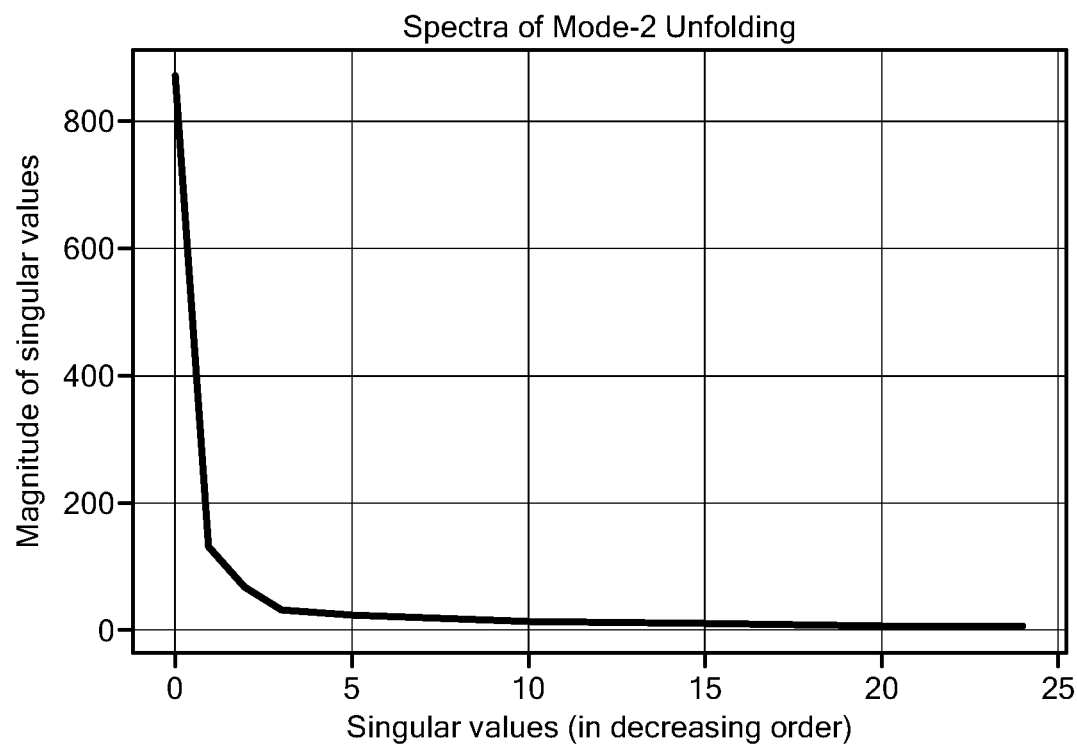

To ensure Assumptions 2, 3, and 7 hold, the spectral profile of the tensor Y are studied. Specifically, one can inspect the spectra of the mode-1 and mode-2 unfoldings of Y, shown in FIGS. 8A and 8B, respectively, to measure r (given in Assumption 2). A mode-1 unfolding of Y results in a 8× (25×4) matrix created by a column-wise concatenation of the columns of $\{Y^{(d)}\}$, while the latter is the 25× (8×4) matrix resulting from the column-wise concatenation of the transposed rows of $\{Y^{(d)}\}$. It can be shown that the maximum rank of the two mode unfoldings provides an upper bound to r. Since over 99% of the spectral energy is captured by the top two singular values in both cases, $r\leq 2$ and hence Assumption 2 is likely valid; more specifically, this implies that Y has a low canonical polyadic tensor rank, which then implies Assumption 2 (see Section 8.2 for details). As discussed in Section 2.1, this also suggests that Assumption 3 likely holds since r is much smaller than N=25. Finally, the clear "elbow" points in both FIGS. 8A and 8B suggest that Assumption 7 likely holds. Assumption 8 is verified in Section 7.2 below.

7.1. Experimental Setup

Regarding pre- and post-intervention periods, for each of the 25 user groups, denote the 8 day user engagement trajectories of the subgroups associated with control as the pre-intervention period. Correspondingly, for each of the 25 user groups, denote the 8 day user engagement trajectories associated with the 10%, 30%, and 50% discount coupons as the post-intervention period.

Regarding the choice of donor groups for each intervention, to simulate a data-efficient RCT, randomly partition the 25 user groups into three clusters, denoted as user groups 1-8, 9-16, and 17-25. For the 10% discount coupon strategy, choose user groups 1-8 as the donor pool, and user groups 9-25 as the collection of targets, i.e., observe the post-intervention data under said discount for groups 1-8, but hold out the corresponding data for groups 9-25. In other words, the SI estimator does not get to observe the trajectories of groups 9-25 under a 10% discount. Using the observed trajectories of user groups 1-8, separately apply the SI estimator to create unique synthetic user engagement trajectories for each of the 9-25 user groups under a 10% discount. Use the metric given by (13) below to compare the estimates against the actual trajectories for user groups 9-25 under a 10% discount. Analogously, one can utilize user groups 9-16 and 17-25 as the donor groups for the 30% and 50% discounts, respectively.

Figure 9A:
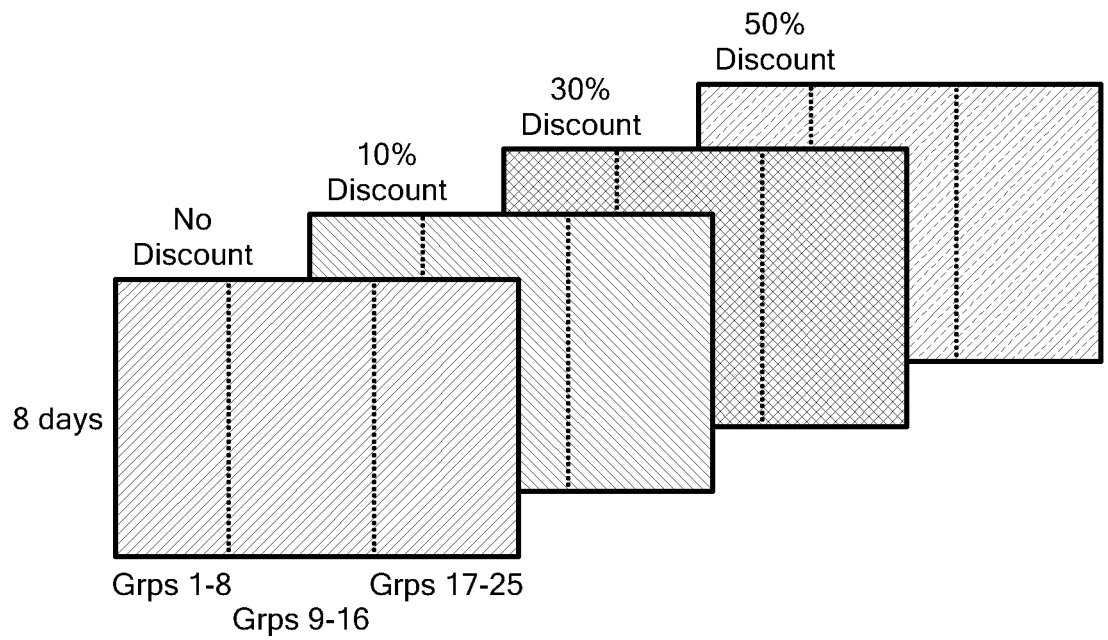
FIGS. 9A and 9B are diagrams showing experimental setups for the illustrative application of FIGS. 8A and 8B.
Figure 9B:
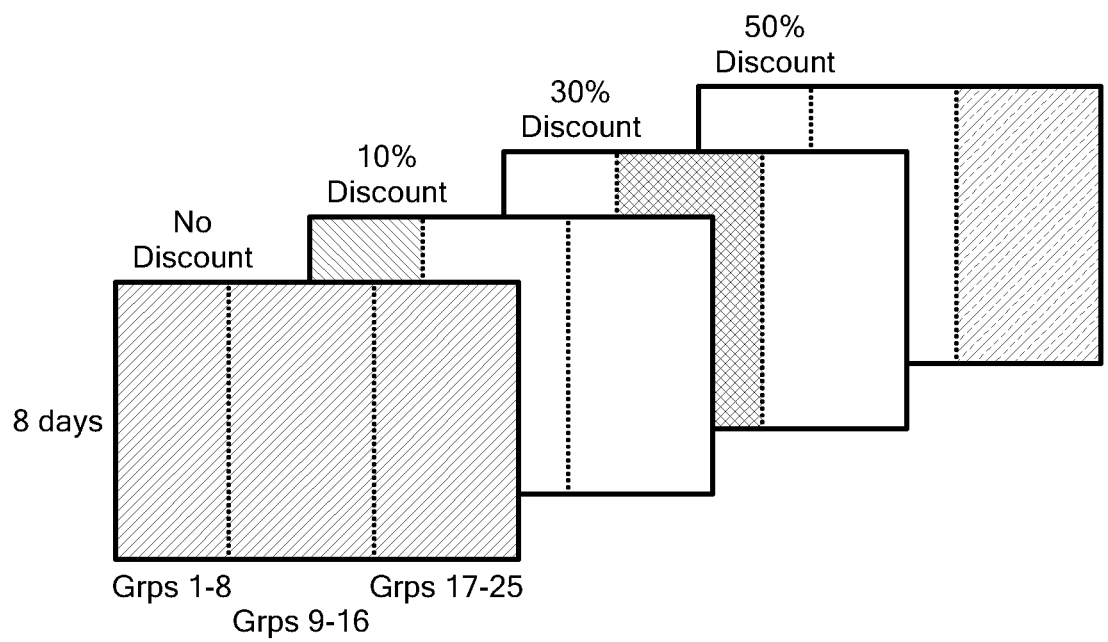

FIGS. 9A and 9B show experimental setups for the e-commerce A/B testing case study. Observations are represented by the grey blocks while unobservable counterfactuals (held-out test sets) are represented by white blocks. FIG. 9A shows the actual experimental setup and FIG. 9B shows the SI experimental setup. In more detail, FIG. 9B shows a visual depiction of the set of experiments/observations the SI estimator uses to make predictions.

To quantify the accuracy of SI's counterfactual predictions, meaningful baseline is needed to compare against. To that end, one can use the following squared error metric for any (n,d) pair:

$$SE_n^{(d)} = 1 - \frac{\left(\theta_n^{(d)} - \hat{\theta}_n^{(d)}\right)^2}{\left(\theta_n^{(d)} - (1/N_d)\sum_{j\in\mathcal{J}^{(d)}} Y_{tj}\right)^2}. \tag{13}$$

The numerator on the right-hand side of (13) represents the squared error associated with the SI estimate $\hat{\theta}_n^{(d)}$. The denominator, $(1/N_d)\Sigma_{j\in\mathcal{J}^{(d)}} Y_{tj}$, is referred to herein as the "RCT estimator"; this is the average outcome across all units within subgroup $\mathcal{J}^{(d)}$ over the post-intervention period. If the units in a RCT are indeed homogeneous (i.e., they react similarly to intervention d), then the RCT estimator will be a good predictor of $\theta_n^{(d)}$. Therefore, $SE_n^{(d)}>0$ indicates the success of the SI estimator over the RCT baseline. Therefore, (13) can be interpreted as a modified $R^2$ statistic with respect to a RCT baseline. In effect, the $SE_n^{(d)}$ captures the gain by "personalizing" the prediction to the target unit using SI over the natural baseline of taking the average outcome over $\mathcal{J}^{(d)}$.

Under the setup above, apply SI to produce the synthetic "counterfactual" trajectories under the three discounts. Evaluate the accuracy under the 10% discount using only the estimated trajectories of user groups 9-25 (since user groups 1-8 are donors). Similarly, use the estimated trajectories of user groups 1-8 and 17-25 for the 30% discount, and user groups 1-16 for the 50% discount. To mitigate the effects of randomness, this procedure is repeated 100 times. Within each iteration, randomly sample a permutation of the 25 user groups to create different sets of donors (i.e., groups 1-8, 9-16, 17-25).

TABLE 1

| Intervention | Hypo. Test ($\alpha = 0.05$) | $SE^{(d)}$ |
| --- | --- | --- |
| 10% discount | Pass | 0.98 ± 0.04 |
| 30% discount | Pass | 0.99 ± 0.03 |
| 50% discount | Pass | 0.99 ± 0.01 |

TABLE 1 shows the hypothesis test results for the three discount strategies, and the median $SE_n^{(d)}$ across the 25 user groups averaged over all 100 iterations, denoted as $SE^{(d)}$. The hypothesis test passes for each discount at a significance level of $\alpha=0.05$ in every iteration, which indicates Assumption 8 likely holds. Across the three discounts, SI achieves an average $SE^{(d)}$ of at least 0.98 and a standard deviation of at most 0.04. In words, the SI estimator far outperforms the RCT estimator. This indicates significant heterogeneity amongst the user groups in how they respond to discounts, and thus warrants the e-commerce company running separate A/B tests for each of the 25 groups.

In this A/B testing framework, the e-commerce company implemented a total of 100 distinct experiments—one experiment for each of the 25 user groups under each of the 4 interventions (0%, 10%, 30%, and 50% discounts). In contrast, the SI framework only required observations from 50 experiments to produce the estimated post-intervention trajectories. In particular, SI utilized two experiments for each of the 25 user groups: one in the pre-intervention period (under 0% discount) and one in the post-intervention period (under exactly one of the 10%, 30%, 50% discounts). See FIG. 9A for a visual depiction of the experiments conducted by the e-commerce company in comparison to what is required by SI, shown in FIG. 9B.

More generally, with N units and D interventions, an RCT requires N×D experiments to estimate the optimal "personalized" intervention for every unit. Meanwhile, under Assumptions 1 to 8, SI requires 2N experiments as follows: in the first N experiments, all units are under the same intervention regime, say control (d=0); next, divide all N units into D partitions each of size N/D, and assign intervention d to units in the d-th partition, which leads to another N experiments. Crucially, the number of required experiments does not scale with D, which becomes significant as the number of interventions, i.e, level of personalization, grows. Also, if pre-intervention data is already being collected, which is common in many settings (e.g., this e-commerce case study), then SI only requires running N experiments. This can be significant when experimentation is costly (e.g., clinical trials).

8. Causal Inference & Tensor Estimation

In this section, classical potential outcomes frameworks are reinterpreted through the lens of tensors. Specifically, an order-3 tensor with axes that correspond to time, units, and interventions is considered. Each entry of this tensor is associated with the potential outcome for a specific time, unit, and intervention. Recall FIG. 2 for a graphical depiction of this tensor. Therefore, estimating unobserved potential outcomes, the fundamental task in causal inference, is equivalent to estimating various missing entries of this order-3 potential outcomes tensor. Indeed, imputing entries of a tensor that are noisy and/or missing is the goal of tensor estimation (TE).

Section 8.1 discusses the connection between these two fields in greater detail. More specifically, Section 8.1 points out how important concepts in causal inference have a related notion in tensor estimation. Section 8.2 shows how low-rank tensor factor models, prevalent in the TE literature, provide an elegant way to encode the structure between time, units, and interventions, while making minimal parametric assumptions. Low-rank tensor factor models may lead to the identification of new causal parameters and guide the design of novels algorithms to estimate said causal parameters. Section 8.3 poses what algorithmic advances are required in the TE literature to allow it to more directly connect with causal inference.

8.1. Encoding Causal Inference as Tensor Estimation

Different observational and experimental studies that are prevalent in causal inference can be equivalently posed as different sparsity patterns within a tensor. Continuing with the notation used in this disclosure, consider the setting with T measurements (which may refer to different metrics or time points), N units, and D interventions. A common thread of these studies is that each of the N units can only experience one, or a small subset, of the possible D interventions, e.g., if a unit is an individual, then it is only feasible to observe her under one intervention. This constraint naturally induces a block sparsity pattern, as exhibited FIGS. 10A and 10B.

Figure 10A:
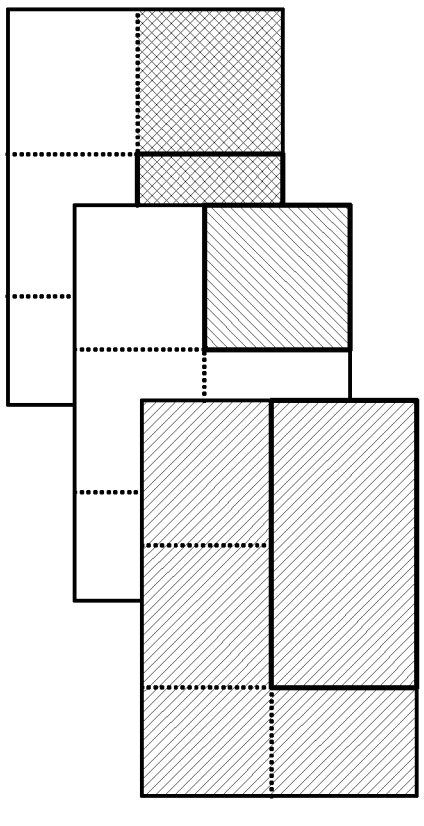
FIG. 10A and FIG. 10B are diagrams showing block sparsity patterns induced by standard observational/experimental studies described herein.
Figure 10B:
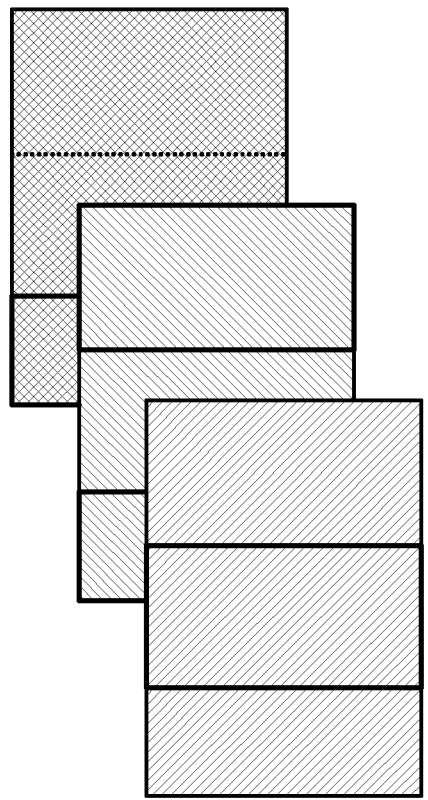

FIGS. 10A and 10B illustrate block sparsity patterns induced by standard observational/experimental studies. The rows correspond to measurements (e.g., time), columns to units, and slices to interventions. Observed outcomes under different interventions are shaded by a unique greyscale, while unobservable counterfactuals are shown in white. FIG. 10A shows studies with pre- and post-intervention periods, but units can only receive a single intervention. FIG. 10B shows studies without pre- and post-intervention periods, but units can receive one or a subset of interventions.

FIG. 10A depicts the setting analyzed throughout this disclosure, i.e., there is a notion of a pre- and post-intervention period and each unit can only undergo one intervention (recall the definition of $T_0$ and $T_1$); as a result, the block sparsity pattern induced is that for each unit n, one is missing a $(D-1) \times T_1$ block of measurements that are of interest. (Strictly speaking, the pre- and post-intervention periods are not imperative. Instead, for each unit one can observe some subset of size $T_0$ of the T measurements, and are missing the remaining $T_1$ elements.) In comparison, FIG. 10B showcases another standard setup that removes the notion of a pre- and post-intervention period, but now each unit receives one or possibly a small subset of the possible interventions. One application of such a setup is in the context of healthcare and the life sciences, where it is feasible to perform multiple experiments on the same unit (e.g., cell type or patient subgroup), but the number of experiments is severely constrained by financial and ethical considerations. In such a setup, for each d, one is missing a $(N-N_d) \times T$ block of measurements, where $N_d = |\mathcal{I}^{(d)}|$ is the number of units that experienced d.

Now discussed is the relationship between causal inference with different target causal parameters and TE under different error metrics. The first step in causal inference is to define a target causal parameter, while the first step in tensor estimation is to define an error metric between the underlying and estimated tensors. Below are discuss a few important connections between these two concepts. To begin, consider as the causal parameter the average potential outcome under intervention d across all T measurements and N units (if there is a pre- and post-intervention period, then the target causal parameter is typically restricted to the $T_1$ post-intervention measurements). Then, estimating this parameter can equivalently be posed as requiring a tensor estimation method with a Frobenius-norm error guarantee for the d-th slice of the potential outcomes tensor with dimension $T \times N$, normalized by $1/\sqrt{TN}$. As such, a uniform bound for this causal parameter over all D interventions would in turn require a guarantee over the max (normalized) Frobenius-norm error for each of the D slices. Another causal parameter is unit n's potential outcome under intervention d averaged over all T measurements (recall, this is $\theta_n^{(d)}$). Analogously, this translates to the $\ell_2$-norm error guarantee of the n-th column of the d-th tensor slice, normalized by $1/\sqrt{T}$. A uniform bound over all N units for the d-th intervention would then correspond to a $\ell_{2,\infty}$-norm error for the d-th tensor slice. As a final example, let the target causal parameter be the unit potential outcome under intervention d and measurement t. This would require a TE method with a max-norm (entry-wise) error of the d-th matrix slice. Similar as above, a uniform bound over all measurements, units, and interventions corresponds to a max-norm error over the entire tensor.

8.2. Learning Across Interventions Via Tensor Factor Models

Regarding a tensor factor model, one can start by introducing a low-rank tensor factor model, which is natural generalization of the traditional factor model considered in the panel data literature. More formally, let $Y=[Y_{tn}^{(d)}] \in \mathbb{R}^{T \times N \times D}$ denote an order-3 tensor of potential outcomes. A tensor factor model over Y admits the following decomposition:

$$Y_{tn}^{(d)} = \sum_{\ell=1}^{r} u_{t\ell} v_{n\ell} \lambda_{d\ell} + \varepsilon_{tn}, \quad (14)$$

where r is the canonical polyadic (CP) rank, $u_t \in \mathbb{R}^r$ is a latent time (or more generally, measurement) factor, $v_n \in \mathbb{R}^r$ is a latent unit factor, and $\lambda_d \in \mathbb{R}^r$ is a latent intervention factor. Note that if attention is restricted to a matrix (e.g., restricting the potential outcomes to a particular time, unit, or intervention slice), then the CP rank and standard matrix rank match. Importantly, the factorization in Assumption 2 is implied by the factorization assumed by a low-rank tensor as given in (14). In particular, Assumption 2 does not require the additional factorization of the (time, intervention) factor $u_t^{(d)}$ as $\langle u_t, \lambda_d \rangle$, where $u_t$ is a time specific factor and $\lambda_d$ is an intervention specific factor.

The implicit factorization of $\mathbb{E}[Y_{tn}^{(d)}]$ given in (1) allows the SI causal framework to identify and estimate $\theta_n^{(d)}$ for any d, i.e., beyond d=0. In particular, this factorization enables a model to be learned under control yet transferred to another intervention regime. An added benefit, as previously stated, is that this also precludes the need for covariate information with respect to time, units, or interventions. That is, directly learning on the observed outcomes (and appropriately de-noising) exploits this latent structure between the dimensions of the tensor to impute missing potential outcomes. In contrast, traditional methods that learn across interventions require access to meaningful covariate information.

9. Synthetic Interventions Procedure

Described next is a procedure for generating synthetic interventions data. Embodiments of the procedure can be implemented within the system 100 of FIG. 1, for example. A goal of the procedure to produce "synthetic data" associated with a unit (e.g., patient/patient type) that is not readily available or is infeasible to collect (e.g., effect of a drug currently untested on that patient). In particular, the procedure constructs synthetic data for a given "target" unit i had it received a given intervention d (sometimes referred to as a "subject intervention"), where it is assumed that data associated with target unit i under subject intervention d is missing or otherwise unavailable.

During a data preparation phase of the procedure, one or more of the following steps may be performed. First, prepare a database where for each unit, data associated with all interventions that unit goes through is collected or otherwise prepared. Next, query a database (e.g., observations database 104 of FIG. 1) for all observations associated with target unit i. Next, query a database (e.g., observations database 104 of FIG. 1) for all observations associated with "donor" units that underwent subject intervention d. Next, filter the data so as to identify the collection of observations associated with common interventions between target unit i and the relevant donor units that maximizes the minimum between the (i) number of satisfactory observations and (ii) number of filtered donor units. Next, create/populate a table (e.g., within intermediate database 116 of FIG. 1) that includes data pertaining to the common interventions associated with the target unit and filtered donor units (from the previous step); denote these two data structures as $y_1$ and $X_1$, respectively. Next, create/populate a table (e.g., within intermediate database 116 of FIG. 1) that only includes of data pertaining to the interventions associated with the filtered donor units under subject intervention d; denote this data structure as $X_2$.

During a data validation phase of the procedure, one or more of the following steps may be performed. First, create a new table that concatenates $X_1$ and $X_2$, i.e., $X=[X_1, X_2]$ in a column-wise manner. Next, perform the singular value decomposition of X and inspect its spectral profile. Check to see if X exhibits low-dimensional structure (e.g., using the techniques described above in Section 3). If X does not exhibit low-dimensional structure, then optionally pre-process X e.g., apply an autoencoder to X to identify a new low-dimensional representation of X). Next, perform the subspace inclusion hypothesis test on $X_1$, $X_2$ detailed in Section 5, above. If the hypothesis test passes, then there may be sufficiently strong diagnostic evidence (as established in Section 4, above), that one can accurately create synthetic data for target unit i under subject intervention d. In some embodiments, one or more steps of the data validation phase may be omitted.

During a synthetic data generation phase of the procedure, one or more of the following steps may be performed. First, choose a pre-defined training error tolerance E. Next, follow the synthetic data generation procedure detailed in Section 3, above. One or more ML techniques can be used to generate a learned model representing to a relationship between the target unit and the filtered donor units. In some embodiments, perform principal component regression (PCR) between $y_1$ and $X_1$ to yield $\hat{\beta}$, which defines the unique minimum-norm linear relationship between the target unit i and filtered donor units. Note that Section 3, above, lists numerous principled methods to choose the sole hyperparameter of PCR. More generally, one could use a different machine learning (ML) algorithm (parametric or nonparametric) to learn a relationship between $y_1$ and $X_1$ (e.g., using a neural network or a random forest). Denote the learned model between $y_1$ and $X_1$ as $\hat{f}$.

Next, intermediary synthetic data model validation can be performed. For example, compute the training error between the observations $y_1$ and estimates $X_1\hat{\beta}$; if the error is below $\varepsilon$, then proceed to the next step as the learnt model between the target unit and donor units is satisfactory, with respect to prediction, for the practitioner (this also demonstrates that the underlying data likely satisfies the desirable properties for this estimation procedure, as described above in Sections 3 and 4). In some embodiments, the intermediary synthetic data model validation may be omitted.

Next, synthetic data associated with target unit i under subject intervention d can be generated as $X_2\hat{\beta}$; from here, the practitioner can apply further procedures on top of the estimates, $X_2\hat{\beta}$ (or more generally, $\hat{f}(X_2)$) e.g., by computing the mean, which expresses the average counterfactual outcomes of target unit i under subject intervention d.

In some embodiments, the procedure can further include diagnosing the accuracy of the generated synthetic data. For example, one can perform "cross-validation" studies to investigate whether the steps listed above are successful in recreating the observed dataset. More formally, each donor unit is iteratively assigned to be the target unit, and the remaining donor units then form the donor group for that particular iteration. That is, in this case, one can observe the temporary target unit's observations under the subject intervention d (i.e., have access to the "synthetic" data one is trying to reproduce). The same procedure described above is then carried out with the extra validation of measuring the prediction error between $X_2\hat{\beta}$ (more generally, $\hat{f}(X_2)$), where $X_2$ is now defined over the temporary donor group, and the observations associated with the temporary target unit under subject intervention d.

Figure 11:
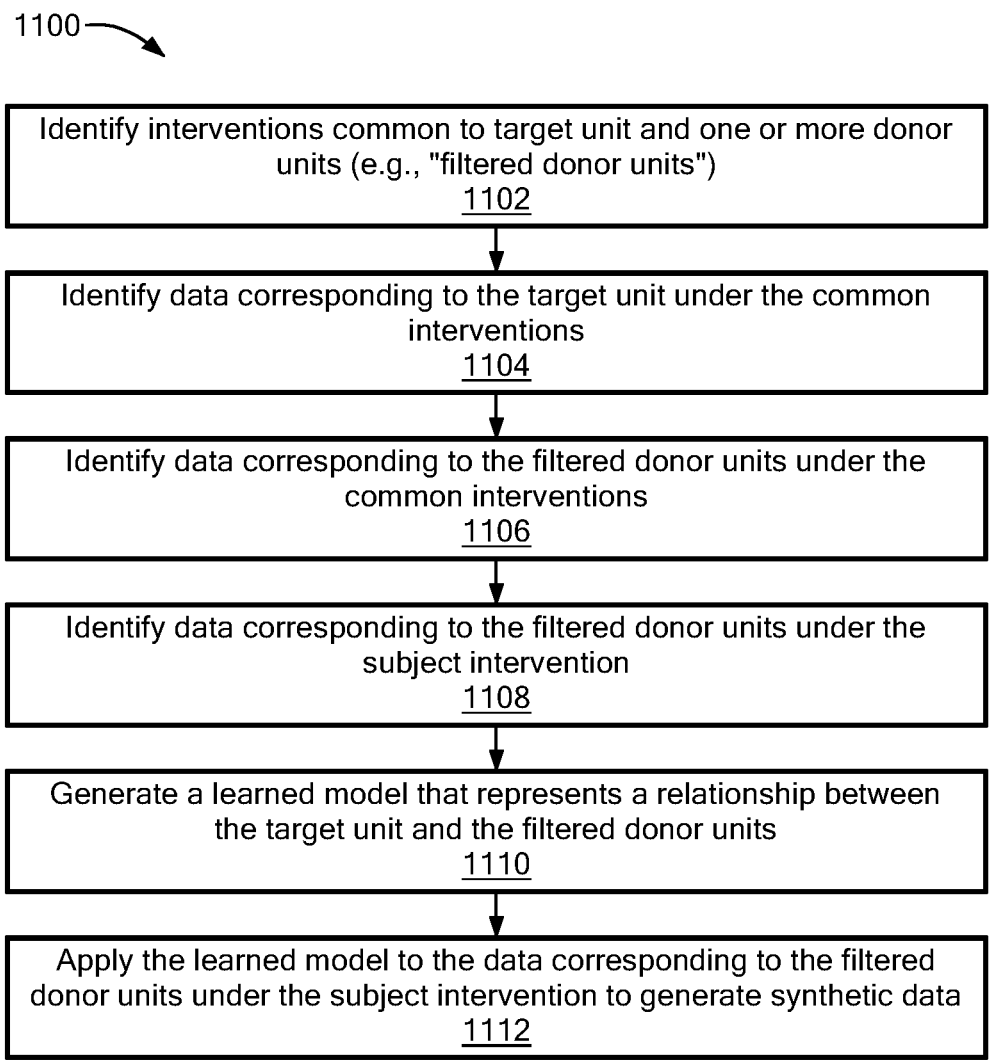
FIG. 11 is a flow diagram showing a method of producing synthetic interventions (SI) data, according to some embodiments of the present disclosure.

FIG. 11 shows an example of a method 1100 of producing synthetic interventions (SI) data, according to some embodiments of the present disclosure. In more detail, method 1100 can be used to generate synthetic data for a particular unit ("target unit") had the target unit undergone a given intervention ("subject intervention"). Illustrative method 1100 may be implemented, for example, within system 100 of FIG. 1.

At block 1102, interventions common to the target unit and one or more of a plurality of donor units can be identified from first and second data. The first data may correspond to the target unit under one or more interventions and the second data may correspond to the plurality of donor units each under one or more interventions. The first and second data can be retrieved, for example, from a database (e.g., observations database 104 of FIG. 1). In some embodiments, block 1102 can include filtering the first and second data to identify the collection of observations associated with common interventions between the target unit the relevant donor units that maximizes the minimum between the (i) number of satisfactory observations and (ii) number of filtered donor units.

At block 1104, third data corresponding to the target unit under the common interventions can be obtained or otherwise identified from the first data. At block 1106, fourth data corresponding to the filtered donor units under the common interventions can be obtained/identified from the second data. At block 1108, fifth data corresponding to the filtered donor units under the subject intervention can be obtained/identified from the second data. The data obtained/identified at blocks 1104, 1106, 1108 can be stored, for example, within a database (e.g., intermediate database 116 of FIG. 1).

At block 1110, a learned model can be generated based on the third and fourth data (from blocks 1104, 1106). The learned model may represent a relationship between the target unit and the filtered donor units. In some embodiments, principal component regression (PCR) can be performed between the third and fourth data to generate a learned model that defines the unique minimum-norm linear relationship between the target unit and the filtered donor units. Other ML techniques can be used as previously discussed.

At block 1112, the learned model can be applied to the fifth data (from block 1108) to generate the synthetic data. Techniques for applying the learned model to generate synthetic data are described above in Section 9. The generated synthetic data can then be stored (e.g., within database 106 of FIG. 1) and/or transmitted to a system configured to use the synthetic data to assist with, or automate, various decision-making processes such as policy decision making.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the specification to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method implemented on one or more computing devices for generating synthetic data for a target unit had the target unit undergone a subject intervention:
    identifying, from first and second data, interventions common to the target unit and one or more of a plurality of donor units as filtered donor units, the first data corresponding to the target unit under one or more interventions, the second data corresponding to the plurality of donor units each under one or more interventions;
    identifying, from the first data, third data corresponding to the target unit under the common interventions;
    identifying, from the second data, fourth data corresponding to the filtered donor units under the common interventions;
    identifying, from the second data, fifth data corresponding to the filtered donor units under the subject intervention;
    generating, from the third and fourth data, a learned model representing a relationship between the target unit and the filtered donor units;
    applying the learned model to the fifth data to generate the synthetic data; and
    using the synthetic data to automate one or more decision-making processes related to which interventions should be applied or targeted to which units.

2. The method of claim 1, further comprising receiving the first and second data from a database.

3. The method of claim 1, wherein identifying the interventions common to the target unit and one or more of a plurality of donor units includes filtering the first and second data to identify observations associated with common interventions between the target unit and the plurality of donor units that maximizes the minimum between a number of satisfactory observations and a number of the filtered donor units.

4. The method of claim 3, wherein the number of satisfactory observations is a number of observations for a particular one of the plurality of donor units at points along a given dimension where observations also exist for the target unit at those same points along the same dimension.

5. The method of claim 4, wherein the dimension is time.

6. The method of claim 1, wherein generating the learned model includes performing principal component regression (PCR) between the third and fourth data to generate a learned model that defines the unique minimum-norm linear relationship between the target unit and the filtered donor units.

7. The method of claim 1, further comprising storing the synthetic data in a database.

8. The method of claim 1, further comprising transmitting the synthetic data to another computing device.

9. The method of claim 8, wherein the another computing device is part of a system configured to automate the one or more decision-making processes using the synthetic data.

10. The method of claim 1 further comprising validating data including at least the fifth data corresponding to the filtered donor units under the subject intervention.

11. The method of claim 10 wherein the validating includes:
    performing a singular value decomposition of the data and inspecting its spectral profile; and
    in response to determining that the data does not exhibit low-dimensional structure, pre-processing the data prior to generating the synthetic data.

12. The method of claim 11 wherein the pre-processing includes applying an autoencoder to identify a new low-dimensional representation of the data.

13. The method of claim 10 wherein the validating includes:
    performing a subspace inclusion hypothesis test on the data; and
    in response to the subspace inclusion hypothesis test passing, determining whether or not accurate synthetic data can be generated for the target unit under the subject intervention,
    wherein the synthetic data is generated in response to determining that accurate synthetic data can be generated.

14. A system for generating synthetic data for a target unit had the target unit undergone a subject intervention, the system comprising:
- a database configured to store first data corresponding to the target unit under one or more interventions and second data corresponding to a plurality of donor units each under one or more interventions; and
- a computing device comprising instructions which, when executed cause the computing device to execute a process including:
  - identifying, from first and second data, interventions common to the target unit and one or more of a plurality of donor units as filtered donor units;
  - identifying, from the first data, third data corresponding to the target unit under the common interventions;
  - identifying, from the second data, fourth data corresponding to the filtered donor units under the common interventions;
  - identifying, from the second data, fifth data corresponding to the filtered donor units under the subject intervention;
  - generating, from the third and fourth data, a learned model representing a relationship between the target unit and the filtered donor units;
  - applying the learned model to the fifth data to generate the synthetic data; and
  - transmitting the synthetic data to another computing device configured to automate one or more decision-making processes using the synthetic data.

15. The system of claim 14, wherein identifying the interventions common to the target unit and one or more of a plurality of donor units includes filtering the first and second data to identify observations associated with common interventions between the target unit and the plurality of donor units that maximizes the minimum between a number of satisfactory observations and a number of the filtered donor units.

16. The system of claim 15, wherein the number of satisfactory observations is a number of observations for a particular one of the plurality of donor units taken at points along a given dimension where observations also exist for the target unit at those same points along the same dimension.

17. The system of claim 16, wherein the dimension is time.

18. The system of claim 14, wherein generating the learned model includes performing principal component regression (PCR) between the third and fourth data to generate a learned model that defines the unique minimum-norm linear relationship between the target unit and the filtered donor units.

19. The system of claim 14, wherein the another computing device is part of a system configured to automate one or more decision-making processes using the synthetic data.

* * * * *